(12) United States Patent
Ropp et al.

(10) Patent No.: US 6,429,546 B1
(45) Date of Patent: Aug. 6, 2002

(54) SYSTEMS AND METHODS FOR PREVENTING ISLANDING OF GRID-CONNECTED ELECTRICAL POWER SYSTEMS

(75) Inventors: Michael Eugene Ropp, Brookings, SD (US); Ajeet Rohatgi, Marietta; Miroslav M. Begovic, Atlanta, both of GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 09/443,619

(22) Filed: Nov. 19, 1999

Related U.S. Application Data

(60) Provisional application No. 60/109,178, filed on Nov. 20, 1998.

(51) Int. Cl.$^7$ .................................................. H02J 3/00
(52) U.S. Cl. ............................ 307/31; 307/43; 307/38; 307/51; 307/87
(58) Field of Search ........................ 307/43, 31, 32, 307/52, 38, 51, 87; 361/186, 187; 363/34, 42, 47, 97, 441

(56) References Cited

U.S. PATENT DOCUMENTS

| | | | | |
|---|---|---|---|---|
| 5,493,485 A | * | 2/1996 | Okado | 363/56 |
| 5,686,766 A | * | 11/1997 | Tamechika | 307/43 |
| 6,172,889 B1 | * | 1/2001 | Eguchi et al. | 363/95 |
| 6,219,623 B1 | * | 4/2001 | Wills | 702/60 |

* cited by examiner

*Primary Examiner*—Kim Huynh
*Assistant Examiner*—Robert L. Deberadins
(74) *Attorney, Agent, or Firm*—Thomas, Kayden, Horstemeyer & Risley LLP

(57) ABSTRACT

A preferred embodiment of the electrical power system of the present invention includes a power conditioning unit which is configured to receive the DC electrical output signal to deliver an AC output signal to a grid-connected load. Preferably, the power conditioning unit includes a controller which is configured to monitor the AC output signal so that the power conditioning unit may cease delivering the AC output signal when a characteristic of the AC output signal satisfies an established criterion.

10 Claims, 14 Drawing Sheets

SYSTEMS AND METHODS FOR PREVENTING ISLANDING OF GRID-CONNECTED ELECTRICAL POWER SYSTEMS

CROSS-REFERENCE TO RELATED APPLICATIONS

This application is based on and claims priority to U.S. Provisional Application Ser. No. 60/109,178, filed on Nov. 20, 1998.

BACKGROUND OF THE INVENTION

1. Field of the Invention

The present invention generally relates to grid-connected electrical power systems and, in particular, to systems and methods for preventing islanding of such systems.

2. Description of the Related Art

Recently there has been a resurgence of concern about islanding of grid-connected electrical power systems. Such electrical power systems include photovoltaic (PV) and wind-powered systems, among others. Islanding occurs when such a system continues to energize a section of the grid after that section has been isolated from the main utility voltage source. Generally, islanding is undesirable because it poses a safety hazard to utility service personnel, and also because it can lead to asynchronous reclosure which can damage equipment. It is therefore important that electrical power systems incorporate methods to prevent islanding.

Consider an electrical power system, i.e., a PV system, connected to a feeder line which is in turn connected to the utility grid through a transformer and some sort of switch (a recloser, breaker, fuse, etc.). The PV system consists of a PV array and a power conditioning unit (PCU). A local load also is connected to the feeder line. If the switch were opened, under certain conditions, it is possible for the PV PCU to continue to energize the isolated section of the grid and supply power to the local load. This is "islanding," and the isolated section of the utility being powered by the PV system is referred to as an "island of supply" or, simply, "an island." Utilities frequently use the term "renewable energy island" to differentiate this situation from other types of islands. Although this distinction is frequently important, for brevity, we will use the term "island" throughout without ambiguity.

The amount of time between the disconnection of the utility and the shutdown of the PCU is referred to as the run-on time. Islanding events typically are subdivided into two categories: long-term, with run-on times of one second or more, and short-term, with run-on times of less than one second.

As mentioned briefly hereinbefore, the primary concern with long-term islanding is one of safety. For example, maintenance or repair personnel arriving to service the isolated feeder may be unaware that it is still energized, which could lead to personal injury. This is of particularly great concern in the case of scheduled maintenance, when the switch would be manually operated by service personnel who typically immediately commence work on the isolated system. In this case, islanding of even a few tenths of seconds could be dangerous.

Another problem associated with both long-term and short-term islanding is that the electrical power system, which relies on the utility voltage to provide a phase and frequency reference for its output current, may lose synchronism with the utility while the switch is open. The utility could then reclose on an electrical power system which is out of phase. Most electrical power PCUs are two quadrant devices, designed for unidirectional power flow from the DC to AC side only. This typically is done for economic reasons; two-quadrant converters are less expensive than four-quadrant converters. However, during an out-of-phase reclosure, there are intervals in which the polarities of the voltage and current are opposite. During these intervals, the converter is absorbing power from both the PV, in the case of a PV system, and utility sides, which can lead to destructive component failures in the PCU.

It has been postulated that another possible problem with short-term islanding is that it can interfere with the arc-clearing function of protective relays. However, there is much debate over whether this is a significant issue.

Another problem, which is increasing in relevance, is that some islanding prevention methods interfere with each other, leading to longer run-on times, and possibly failure to detect islanding if several electrical power systems are present in the island. In some cases, this can happen even if all the electrical power systems in the island are using the same islanding prevention scheme. This situation has been termed the "multi-inverter case," and it could become increasingly common with the proliferation of grid-connected electrical power systems, such as roof-mounted PV arrays, for instance, and the development of PCUs for AC PV arrays, in which case there could be tens or even hundreds of PCUs in an island.

Therefore, there is a need for systems and methods which address these and other shortcomings of the prior art.

BRIEF SUMMARY OF THE INVENTION

Briefly described, the present invention provides an electrical power system which incorporates a positive feedback feature for preventing islanding. In a preferred embodiment, the electrical power system includes a power conditioning unit which is configured to receive the DC electrical output signal and to deliver an AC output signal to a grid-connected load. Preferably, the power conditioning unit includes a controller which is configured to monitor the AC output signal so that the power conditioning unit may cease delivering the AC output signal when a characteristic of the AC output signal satisfies an established criterion.

In accordance with an aspect of the present invention, some embodiments may incorporate a controller which is configured to accelerate a shift in frequency of the AC output signal via a modification signal so that either an over-frequency relay or an under-frequency relay of the power conditioning unit prevents delivery of the AC output signal from the power conditioning unit.

In accordance with another aspect of the present invention, a power conditioning unit for use in a photovoltaic system is provided. Preferably, the power conditioning unit includes an inverter, a controller, and a feedback loop, with the inverter being configured to receive the DC electrical output signal of a photovoltaic array, to convert the DC electrical output signal into an AC output signal, and to deliver the AC output signal to a grid-connected load. The feedback loop is configured to provide the controller with information regarding the AC output signal, and the controller is configured to deliver a modification signal to the inverter so that the AC output signal changes in response to the modification signal. So configured, the power conditioning unit may cease delivering the AC output signal when a characteristic of the AC output signal satisfies an established criterion.

In accordance with another aspect of the present invention, a computer readable medium is provided for reducing size of a non-detection zone in a grid network, where the grid network includes an electrical power system adapted for providing power to a grid-connected load. Preferably, the computer readable medium includes: a first code segment configured to measure frequency deviation between an output signal of the grid and an output signal of the electrical power system; a second code segment configured to apply the measured frequency deviation to the output signal of the electrical power system; and, a third code segment configured to discontinue the output signal at the power conditioning unit when the measured frequency of the output signal satisfies an established cut-off level.

In accordance with yet another aspect of the present invention, a preferred method for reducing size of a non-detection zone in a grid network, where the grid network includes an electrical power system adapted for providing power to a grid-connected load, is provided. Preferably, the method comprises the steps of: (1) measuring frequency deviation between an output signal of the grid and an output signal of the electrical power system; (2) applying the measured frequency deviation to the output signal of the electrical power system; and (3) when the measured frequency of the output signal of the electrical power system satisfies an established cut-off level, discontinuing the output signal. In some embodiments, the step of applying the measured frequency deviation includes using the measured frequency deviation as an argument of a function F.

Other features and advantages of the present invention will become apparent to one of reasonable skill in the art upon examination of the following drawings and detailed description. It is intended that all such additional objects, features, and advantages be included herein within the scope of the present invention, as defined by the claims.

BRIEF DESCRIPTION OF THE SEVERAL VIEWS OF THE DRAWINGS

The present invention will be more fully understood from the accompanying drawings of various embodiments of the invention which, however, should not be taken to limit the invention to the specific embodiments enumerated, but are for explanation and for better understanding only. Furthermore, the drawings are not necessarily to scale, emphasis instead being placed upon clearly illustrating the principles of the invention. In the drawings:

FIG. 18 is a graph depicting both frequency versus time and RMS voltage versus time during a representative long run-on.

FIG. 19 is a graph depicting both frequency versus time and RMS voltage versus time during a representative long run-on.

DETAILED DESCRIPTION OF THE PREFERRED EMBODIMENTS

Figure 1:
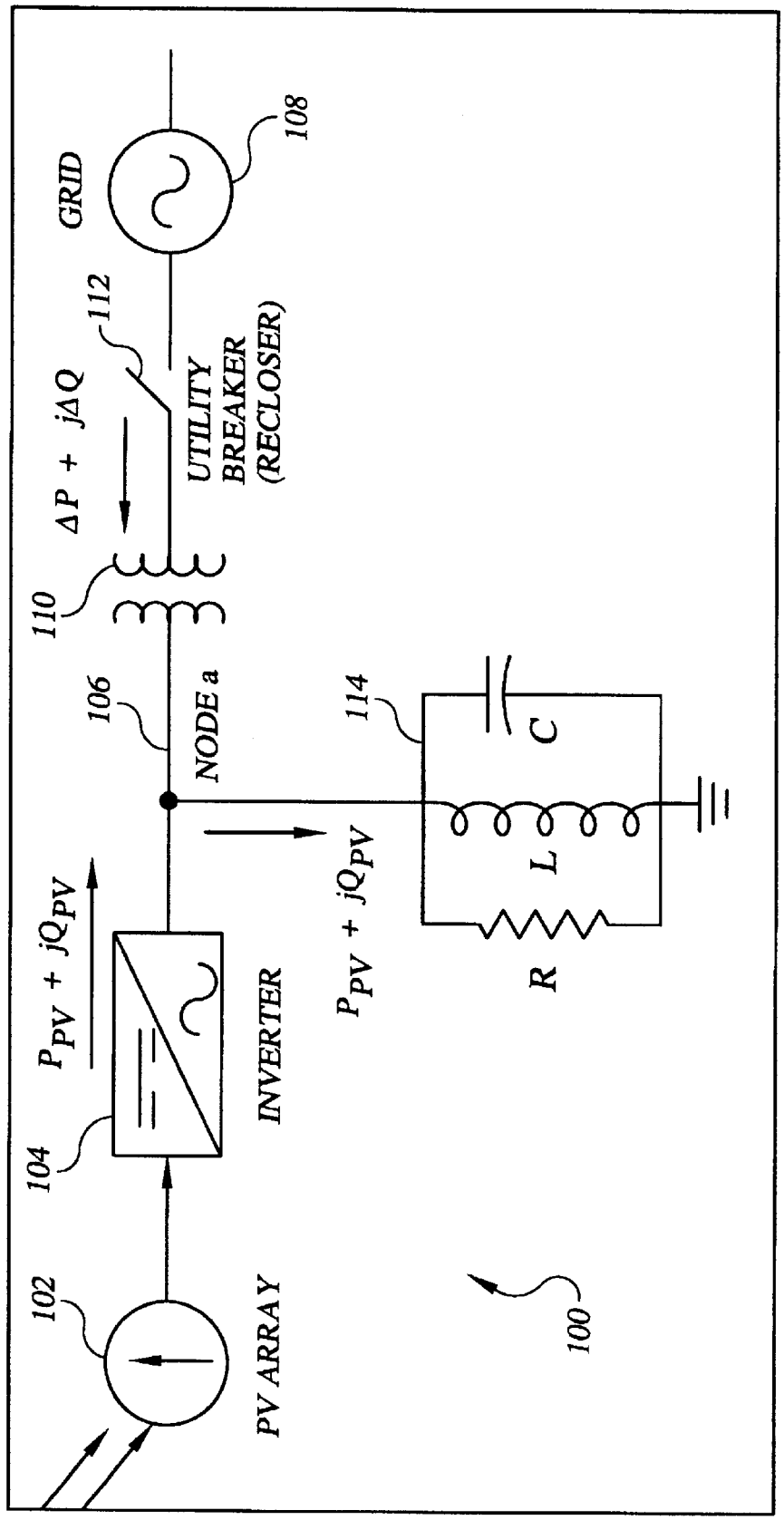
FIG. 1 is a schematic diagram depicting a representative PV system/utility feeder configuration showing definitions of power flows.

Reference will now be made in detail to the description of the invention as illustrated in the drawings, wherein like reference numbers indicate like parts throughout the several views. As a matter of introduction, the following is a brief discussion of several existing islanding prevention methods. It should be noted that, although the present invention is described herein in relation to a PV electrical power system, the present invention also is suitable for use with other types of grid-connected power systems as well.

A grid-connected PV system 100, such as depicted in FIG. 1, typically includes a PV array 102 and a power conditioning unit (PCU) 104 which are connected to a feeder line 106. In turn, feeder line 106 is connected to the utility grid 108, such as through a transformer 110 and a switch 112, i.e., a recloser, breaker, fuse, etc. A local load 114 also typically is connected to the feeder line. Such a grid-connected PV system typically is required to have an overvoltage relay (OVR), an undervoltage relay (UVR), an overfrequency relay (OFR), and an underfrequency relay (UFR) which disconnect the PV system from the utility in the event that the magnitude or frequency of the PCU's terminal voltage goes beyond certain limits. Under most circumstances, these relays will prevent islanding. To understand this, consider the configuration shown in FIG. 1. When the recloser is closed, real and reactive power $P_{PV}+jQ_{PV}$ flows from the PV system to node a, and power $P_{load}+jQ_{load}$ flows from a to the load. Summing at node a, we see that $$\Delta P = P_{load} - P_{PV}$$

$$\Delta Q = Q_{load} - Q_{PV} \quad [1]$$

are the real and reactive power flowing into the feeder from the utility. It should be pointed out that PV PCUs typically operate with a unity power factor, so under most conditions $Q_{PV}=0$ and $\Delta Q=Q_{load}$. The real and reactive power being consumed by the load are given by $$P_{load} = Re[V_a^* I_{load}] = 2V_a I_{load} \cos\phi$$

$$Q_{load} = Im[V_a^* I_{load}] = 2V_a I_{load} \sin\phi \quad [2]$$

where $\cos\phi$ is the load displacement power factor (dpf) and $V_a$ and $I_{load}$ are the RMS values of $v_a$, the instantaneous voltage at a, and the load current. The superscript asterisk denotes complex conjugation. Assuming that the load can be represented as a parallel RLC circuit, these expressions may be written in terms of $V_a$ as follows:

$$P_{load} = V_a(V_a/R_{load}) \quad [3]$$

$$Q_{load} = V_a$$

$$Q_{load} = V_a \left[ \frac{V_a}{\omega L} - \frac{V_a}{\frac{1}{\omega C}} \right] \quad [4]$$

When the recloser opens, $\Delta P$ and $\Delta Q$ will both go to zero. The behavior of the isolated system will depend on $\Delta P$ and $\Delta Q$ at the instant before the recloser opens to form the island, which we denote $\Delta P-$ and $\Delta Q-$. There are four cases in which the OVR/UVR or OFR/UFR are configured to prevent islanding:

1) $\Delta P\text{-}>0$. In this case, the PV system is producing less real power than is required by the local load ($P_{load}>P_{PV}$). From Equation [3], we see that when the switch opens and $\Delta P$ becomes zero, $P_{load}$ will decrease, meaning that $V_a$ must also decrease since $R_{load}$ can be assumed to be constant over this time interval. This decrease can be detected by the UVR, and islanding should be prevented;
2) $\Delta P\text{-}<0$. In this case, $P_{load}<P_{PV}$, and power is flowing into the utility system. Now, when $\Delta P$ becomes zero, $P_{load}$ must increase and $V_a$ will also increase. This condition can be detected by the OVR, and again islanding should be prevented.
3) $\Delta Q\text{-}>0$. This case corresponds to a lagging power factor load, or a load whose reactive component is inductive. After the recloser opens, $\Delta Q=0$. However, as previously mentioned, $Q_{pv}$ is usually zero, and therefore, $Q_{load}=0$. This requires the term in square brackets in Equation [4] to become zero, meaning that the inductive part must drop and the capacitive part must increase. Equation [4] shows us that in order for this to occur the frequency $\omega$ of $v_a$ must increase. This increase in $\omega$ can be detected by the OFR.
4) $\Delta Q\text{-}<0$. This case corresponds to a leading power factor load, or one which is primarily capacitive. As in case 3, when AQ becomes zero, the inductive and capacitive parts of Equation [4] must balance so that $Q_{load}=0$, and this requires $\omega$ to decrease. This can be detected by the UFR.

Note that cases 3) and 4) can be expressed in terms of a phase condition. The PV system will cause the frequency to change until the following condition is satisfied:

$$\arg\{R^{-1}+j\omega C-j(\omega L)^{-1}\}=0 \quad [5]$$

This occurs at the load's resonant frequency, $\omega_{res}=(LC)^{-0.5}$. At $\omega_{res}$, steady state is reached and no further change in $\omega$ occurs. If $\omega$ lies outside the trip limits of the OFR/UFR, islanding will not occur. It bears repeating at this point that all PCUs for utility interface applications are presently required to have OVR/UVR and OFR/UFR protection. Therefore, if either the real or active power of the load and PV system are not matched, and the thresholds for the OVR/UVR and OFR/UFR are properly chosen, islanding should not occur.

Figure 2:
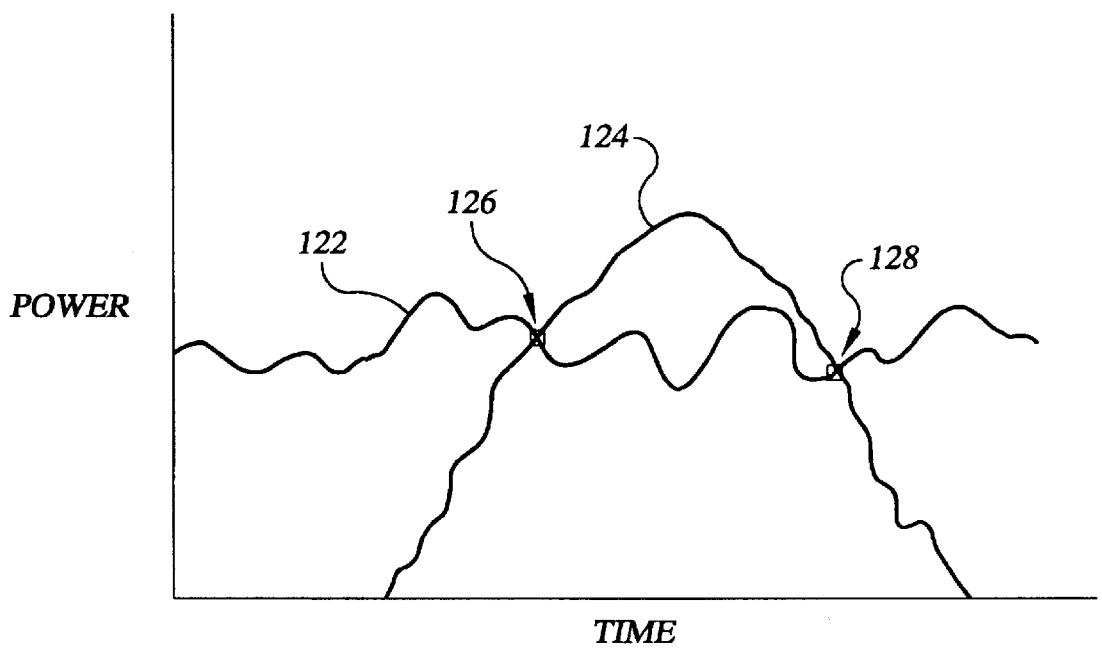
FIG. 2 is a graph depicting PV power production versus load power requirements.
Figure 3:
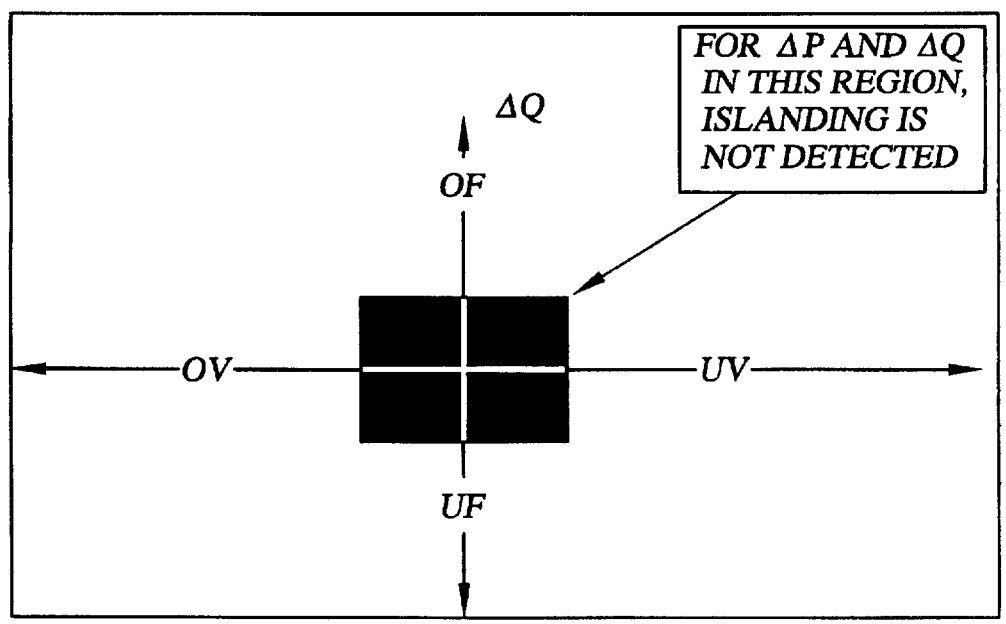
FIG. 3 is a graph depicting a representative non-detection zone (NDZ).

We have thus far examined four cases in which the OVR/UVR and OFR/UFR of a PV system will prevent islanding. Unfortunately, there is another possible case: $\Delta P^- = \Delta Q^- = 0$. This corresponds to a case in which the PV power production is matched to the load power requirement, and the load dpf is unity. Such a case is depicted in FIG. 2, where power production of the PV system (trace 122) matches the load power requirement (trace 124), such as at 126 and 128. In this case, when the switch is opened no change occurs in the isolated system, and the OVR/UVR and OFR/UFR do not operate. In reality, $\Delta P^-$ and $\Delta Q^-$ do not have to be exactly zero for this to occur because the magnitude and frequency of the utility voltage can be expected to deviate slightly from nominal values, and therefore, the thresholds for the four relays cannot be set arbitrarily small or else the PV system will be subject to nuisance trips. This limitation leads to the formation of nondetection zones (NDZs), i.e., NDZs 126 and 128, (with a representative NDZ being shown in detail in FIG. 3). Since it has been shown that the probability of $\Delta P^-$ and $\Delta Q^-$ falling into the NDZ of the OVR/UVR and OFR/UFR can be significant, PV systems should incorporate methods to prevent islanding in the case in which $\Delta P^- = \Delta Q^- \approx 0$.

Methods for Eliminating the NDZ

Passive methods for islanding prevention involve monitoring the PCU's terminal voltage ($v_a$) for some condition which indicates islanding. Several of these methods are discussed hereinafter.

The voltage harmonic monitoring method does not rely on a real or reactive power mismatch for islanding detection. Instead, the PV PCU monitors the total harmonic distortion (THD) of $V_a$ and shuts down if this THD exceeds some threshold. There are two mechanisms which can cause the harmonics in $V_a$ to increase when islanding begins. One of these is the PV PCU itself. A PV PCU will produce some current harmonics in its AC output current, as all switching power converters do. A typical requirement for a grid-connected PV PCU is that it produce no more than 5% THD of its full rated current. Under normal operation, the utility, being a "stiff" voltage source, forces an "undistorted" sinusoidal voltage (THD≈0) across the load terminals, causing the (linear) load to draw an undistorted sinusoidal current. Summing at node a, we see that under this condition the harmonic currents produced by the PCU will flow out into the grid. When the recloser opens, the harmonic currents produced by the PCU will flow into the load, and by Ohm's law and superposition, these will produce harmonics in $v_a$. These voltage harmonics can be detected by the PCU, which can then assume that the PV system is islanding and discontinue operation.

The second mechanism is the voltage response of the transformer 110 shown in FIG. 1. If the switch 112 which disconnects the utility voltage source from the island is on the primary side of the transformer, the secondary of the transformer will be excited by the output current of the PV system 100. However, because of the magnetic hysteresis of the transformer, the voltage response of the transformer to this (approximately) sinusoidal excitation is highly distorted. In particular, it contains a large third harmonic component. This phenomenon has been verified experimentally; investigators have found that the third harmonic voltage at node a can increase by a factor of five or more when islanding begins because of the distortion introduced by standard pole-mounted transformers.

In theory, the voltage harmonic monitoring method promises to be highly successful in detecting islanding under a wide range of conditions, and its effectiveness should not change significantly in the multiple-inverter case. However, it suffers from a potentially serious implementation difficulty: it is not always possible to select a trip threshold which provides reliable islanding protection but does not lead to nuisance tripping of the PV system. It is clear that a threshold must be selected which is: a) higher than the THD which can be expected in the grid voltage; but b) lower than the THD which will be produced during islanding by the two mechanisms described hereinbefore. For example, let us assume that the PV PCU produces 5% THD in its output current, the maximum allowable limit. For a resistive load fed by this current, the THD of $v_a$ will also be 5%, but for a parallel RLC the load impedance decreases with increasing frequency above $\omega_{res}$, and so there can be less distortion in the voltage response than in the exciting current. It is, therefore, clear that the THD threshold should be set lower than 5%.

In reality, the utility voltage distortion which we assumed to be ≈0 in the foregoing discussion, can actually be expected to be 1–2% under normal conditions, but there are many conditions, such as the presence of power electronic converters which produce current harmonics at frequencies at which the utility system has resonances, which can cause this value to increase significantly. Also, transient voltage disturbances, particularly large ones such as those which accompany the switching of capacitor banks, could be interpreted by PV PCUs as a momentary increase in THD, depending on the measurement technique used. It is clear that in some cases it is not possible to select a threshold that meets criteria a) and b). It may be possible to overcome this problem using digital signal processing and harmonic signature recognition, but these techniques cannot presently be implemented cost-effectively in small PV PCUs. For these reasons, the harmonic monitoring technique has, heretofore, not been used commercially.

Figure 4:
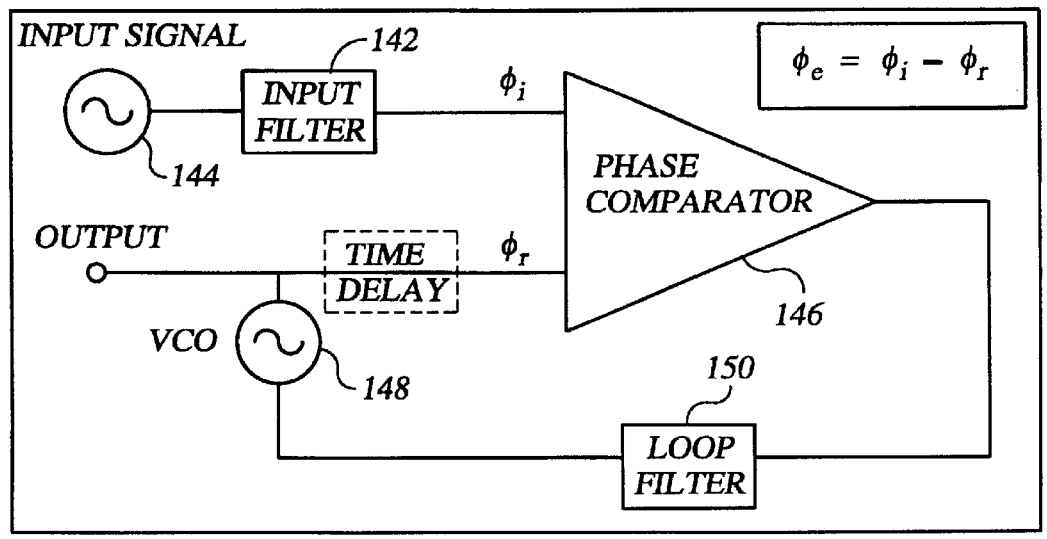
FIG. 4 is a schematic diagram depicting a representative phase-locked loop.

Another method of islanding prevention, phase jump detection (PJD), involves monitoring the phase between the inverter's terminal voltage and its output current for a sudden "jump." Consider the case in which the load 114 in FIG. 1 has a nonunity dpf (nonzero voltage-current phase angle). Under normal operation, the PCU's output current waveform will be synchronized to the utility voltage by detecting the rising (or falling) zero crossings of $v_a$. This is done through the use of a phase-locked loop (PLL). A schematic of the PLL circuit (circuit 140) is shown in FIG. 4. The input line filter 142 removes noise and higher-order harmonics from the input signal 144, in this case $v_a$. The phase comparator 146 generates a signal whose magnitude is proportional to the phase error between its input signals, which are the filtered $v_a$ and the output of the voltage-controlled oscillator 148 (VCO). In most modern PLLs, the phase comparator uses some sort of a measurement of the time between rising zero crossings of its two input waveforms to determine the phase error. The loop filter 150 removes AC components from the output of the phase comparator. The DC output signal of the phase comparator and loop filter is used to adjust the output of the VCO in such a way as to reduce the phase error between its output and $v_a$. In a PV inverter, the VCO output provides the waveform template for the PCU output current $i_{pv}$ and thus has the same phase and frequency as $i_{pv}$. Therefore, the function of the PLL is to synchronize $v_a$ and $i_{pv}$. To implement PJD, we simply need to add a device which measures the DC output signal of the phase comparator and loop filter and generates a signal to deactivate the PCU when this signal reaches or exceeds some threshold.

Figure 5:
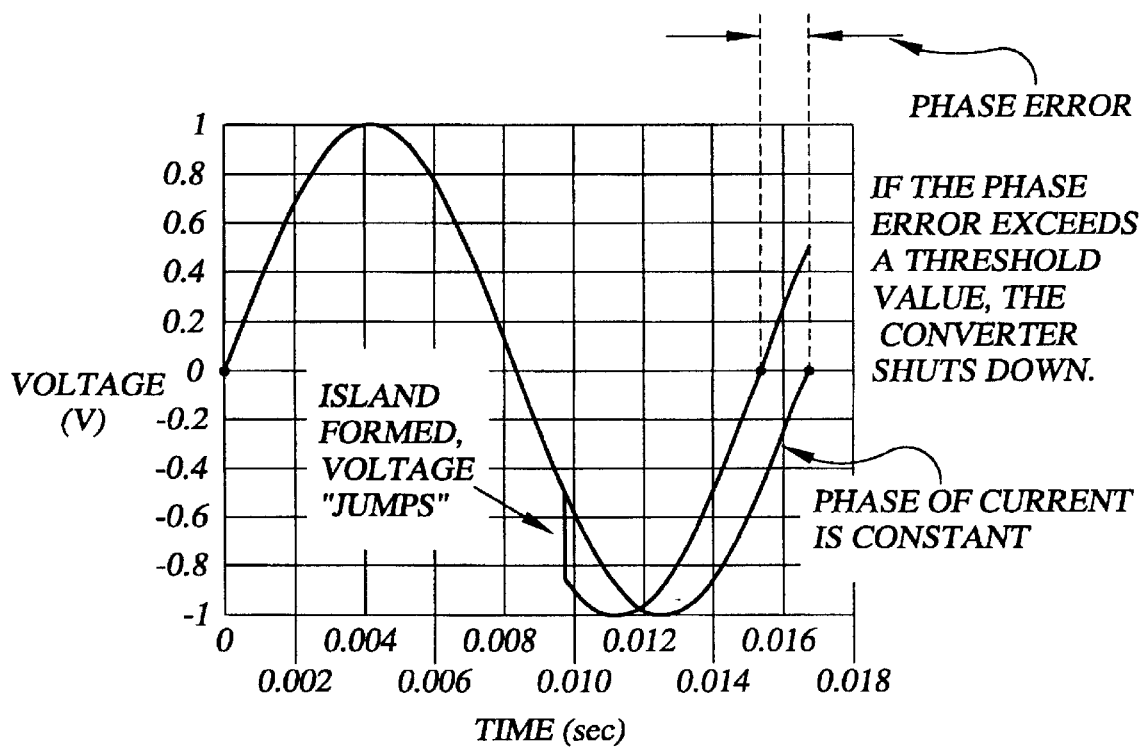
FIG. 5 is a graph depicting the operation of a representative phase-jump detection method.

PJD works as shown in FIG. 5. When the utility is deactivated, suddenly it is the PV current $i_{pv}$ which becomes the fixed phase reference, since $i_{pv}$ is still following the waveform template provided by the PLL. However, since the frequency has not changed, the current-voltage phase angle of the load must be the same as before the utility switch opened, and therefore must "jump" to this new phase as shown in FIG. 5. At the next rising zero crossing of $v_a$, the resulting phase error between the "new" voltage and the PCU's output current, if greater than the threshold, will cause the monitoring device in the PLL to generate its "stop" signal, and islanding is prevented. If we make the simplifying assumption that the system response is instantaneous, we can write an approximate phase criterion for PJD similar to that for the OFR/UFR:

$$|\arg\{R^{-1}+j\omega_k C-j(\omega_k L)^{-1}\}-\arg\{R^{-1}+j\omega_{k-1}C-j(\omega_{k-1}L)^{-1}\}|\geq\phi_{th} \quad [6]$$

where $\omega_k$ is the frequency of $v_a$ in the $k^{th}$ cycle and $\phi_{th}$ is the phase threshold at which a stop signal is generated. If Equation [6] is satisfied at any $\omega_k$ between the utility frequency $\omega_0$ and $\omega_{res}$ then islanding will not occur.

The advantages of PJD are its sensitivity and ease of implementation. Unfortunately, its disadvantage is that it has an NDZ for unity dpf loads, within the existing NDZ of the four standard relays. This NDZ can be moved away from the unity-dpf load region by operating the PCU at a nonunity power factor, but, as was previously mentioned, it cannot be moved very far without making the PCU more expensive. Phase-jump detection therefore can shrink but does not eliminate the NDZ of the four standard relays.

Figure 6:
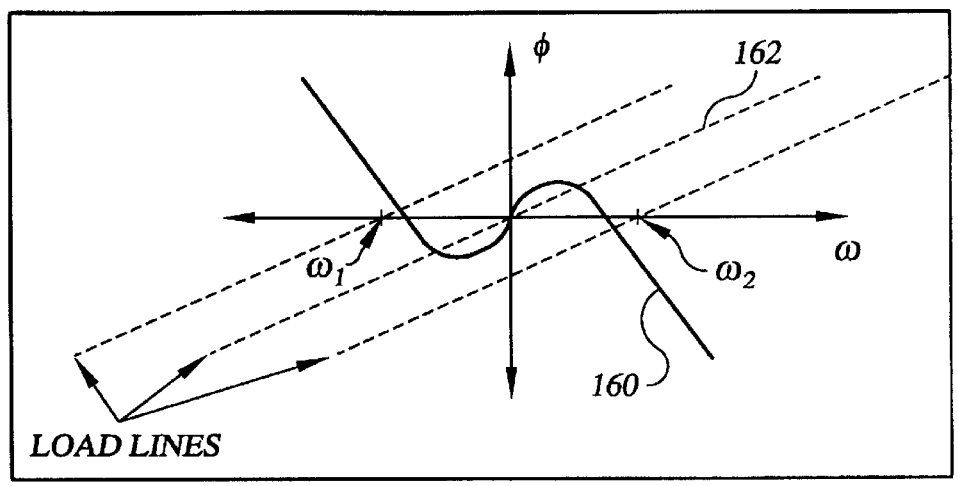
FIG. 6 is a graph depicting phase versus frequency characteristics of a PCU utilizing a representative SMS islanding prevention method.

In the slide-mode frequency shift (SMS) method, the current-voltage phase angle of the PCU, instead of always being controlled to be zero, is made to be a function of the frequency of $v_a$ as shown in FIG. 6. The S-shaped phase response curve 160 of the PCU is designed such that the phase of the inverter increases faster than the phase of most unity-dpf loads in the region near the utility frequency $\omega_0$. This makes $\omega_0$ an unstable operating point for the PCU. While the utility is connected, it stabilizes the operating point $\omega_0$ by providing the phase and frequency reference. However, after the switch opens, the phase frequency operating point of the load and PV system must be at an intersection of the load line and PCU phase response curve. Consider the load line 162 of the unity-dpf load shown in FIG. 6. The load line and PCU curve intersect at $(\omega_0, 0)$, but if there is any small perturbation of the frequency of $v_a$ away from $\omega_0$, the instability of the PCU at $\omega_0$ causes the PCU to reinforce the perturbation and drive the system to a new operating point, either at $\omega_1$ or $\omega_2$, depending on the direction of the perturbation. The PCU phase curve can be designed in such a way that $\omega_1$ or $\omega_2$ lie outside the NDZ of the OFR/UFR.

SMS is implemented through the design of the input line filter, i.e., filter 142 of FIG. 4, to the PLL. This filter controls the phase characteristic of the PCU because it controls the reference signal for the PLL. Therefore, all that is required is to design the input filter to have the desired phase characteristic. We can write an expression for the steady-state frequency attained by this method in terms of another phase criterion:

$$\arg\{R^{-1}+j\omega C-j(\omega L)^{-1}=-\arg\}G(j\omega)\} \qquad [7]$$

where $G(j\omega)$ is the transfer function of the input line filter. Consider the case in which the phase shift of the line filter is zero at the utility frequency and the load has a near-unity dpf. If Equation [7] has more than one solution (see FIG. 6), the solution at the utility frequency is unstable and islanding will not occur.

Figure 7:
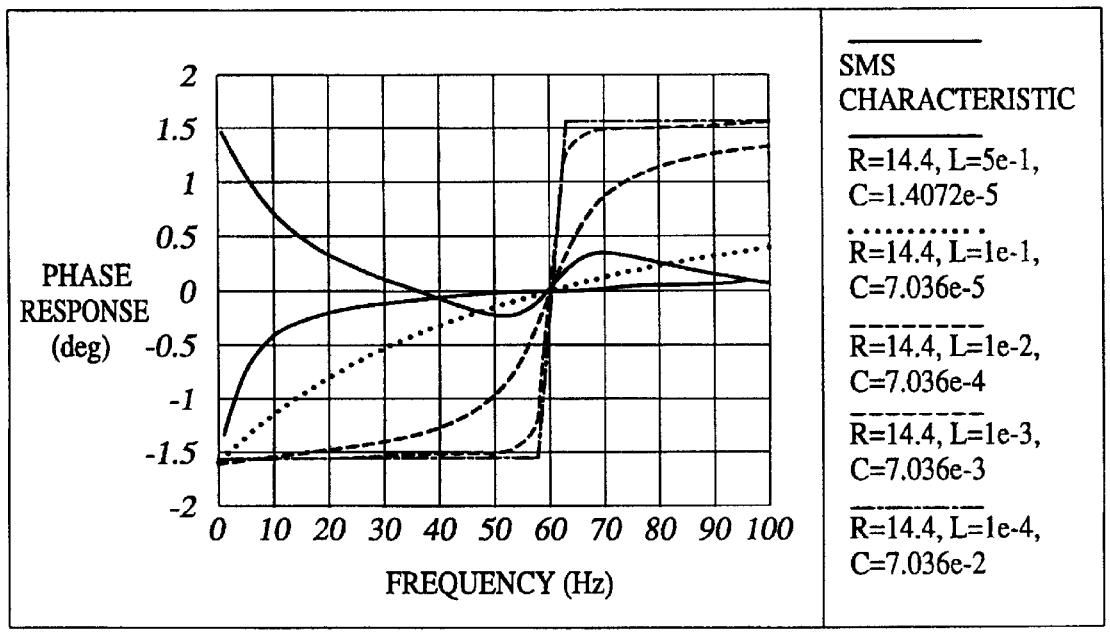
FIG. 7 is a graph depicting SMS phase-frequency characteristic and the phase responses of several representative RLC loads.
Figure 8:
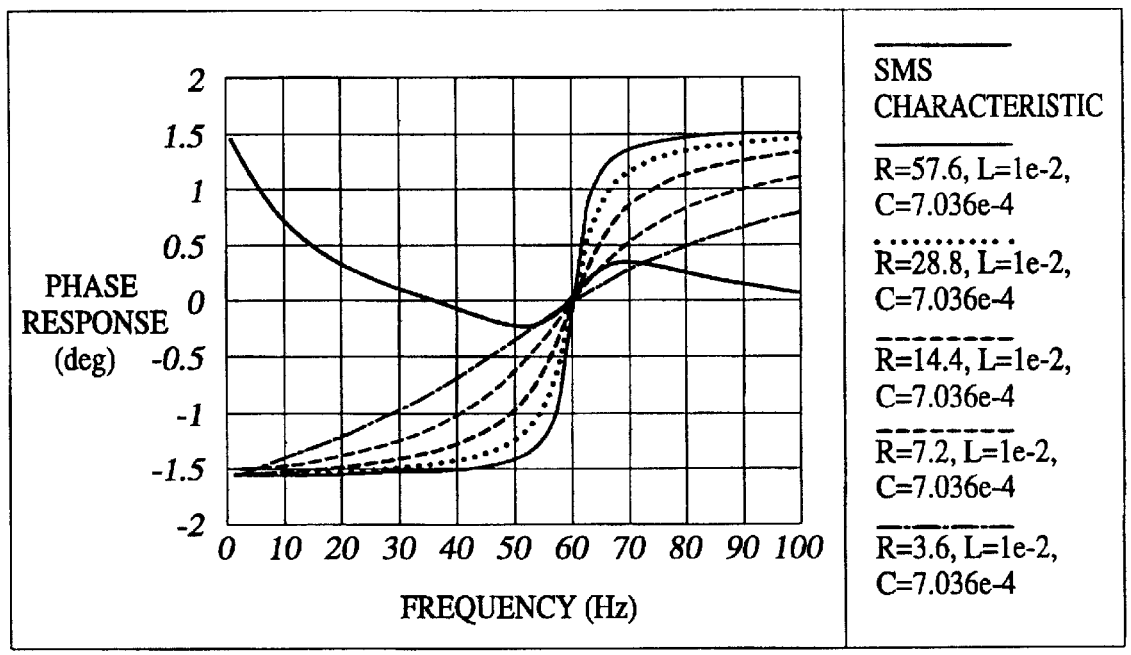
FIG. 8 is a graph depicting SMS phase-frequency characteristic and the phase responses of several representative RLC loads.

This scheme has been shown to be highly effective, both theoretically and experimentally. It works for purely resistive loads, whose phase response curves lie on the frequency axis in FIG. 6. It also works for a wide range of RLC loads. However, some RLC loads have phase response curves such that the phase of the load increases faster than the phase of the PV PCU, meaning that Equation [7] has only one solution at $\omega_0$. This makes the nominal line frequency a stable operating point and renders SMS ineffective. We have performed computer modeling to demonstrate this fact, and the results are shown in FIGS. 7 and 8. In these simulations, an SMS phase response curve from a commercial inverter is plotted against the phase responses of several parallel RLC loads. These examples show that SMS has an NDZ for RLC loads with relatively small values of L but large values of C (FIG. 7), or low-power loads in which R is large (FIG. 8). An additional problem with SMS is that it relies on an uncontrollable, externally-supplied perturbation, which makes predictions of the run-on time of an SMS-equipped PV system difficult.

In order to eliminate the shortcomings of the passive NDZ elimination methods, several active methods have been developed. Active methods involve changing the system configuration or control of $i_{pv}$ in such a way as to cause a change in $v_a$ when islanding. The output variation or impedance measurement method involves introducing a variation into the output of the PV PCU. Typically, the real power output of the PCU is varied by using the PCU's maximum power point tracker to periodically reduce the PV power. If the utility is disconnected, when the PCU output $i_{pv}$ drops, $v_a$ will also drop, and the UVR can prevent islanding. This method is also called an "impedance measurement" because, in effect, the PCU is measuring $dv_a/di_{pv}$. The primary advantage of output variation is that it has no NDZ; for a single PV system with any local load, if the load and PV powers are balanced upon disconnection of the utility, the output variation of the PCU will upset this balance and cause the UVR to trip. However, output variation has many disadvantages. It necessitates a reduction of the efficiency of the PV system (because the PV array will have to be moved off of its maximum power point), which adversely affects the economics of the PV system. Also, the effectiveness of the output variation method decreases in the multi-inverter case.

This happens even if all PCUs in the island are using output variation, unless the variation is somehow synchronized. The reason is that as more PCUs are added to the island, the amount of variation introduced by each PCU into the total $i_{pv}$ being generated by all PV systems is reduced, and eventually the variation becomes so small that the change in $v_a$ becomes undetectable. Finally, for high-power PV systems, output variations can lead to grid instability, voltage flicker, and several other problems. Therefore, output variation may not be suitable for multiple small systems or for single large systems.

Figure 9:
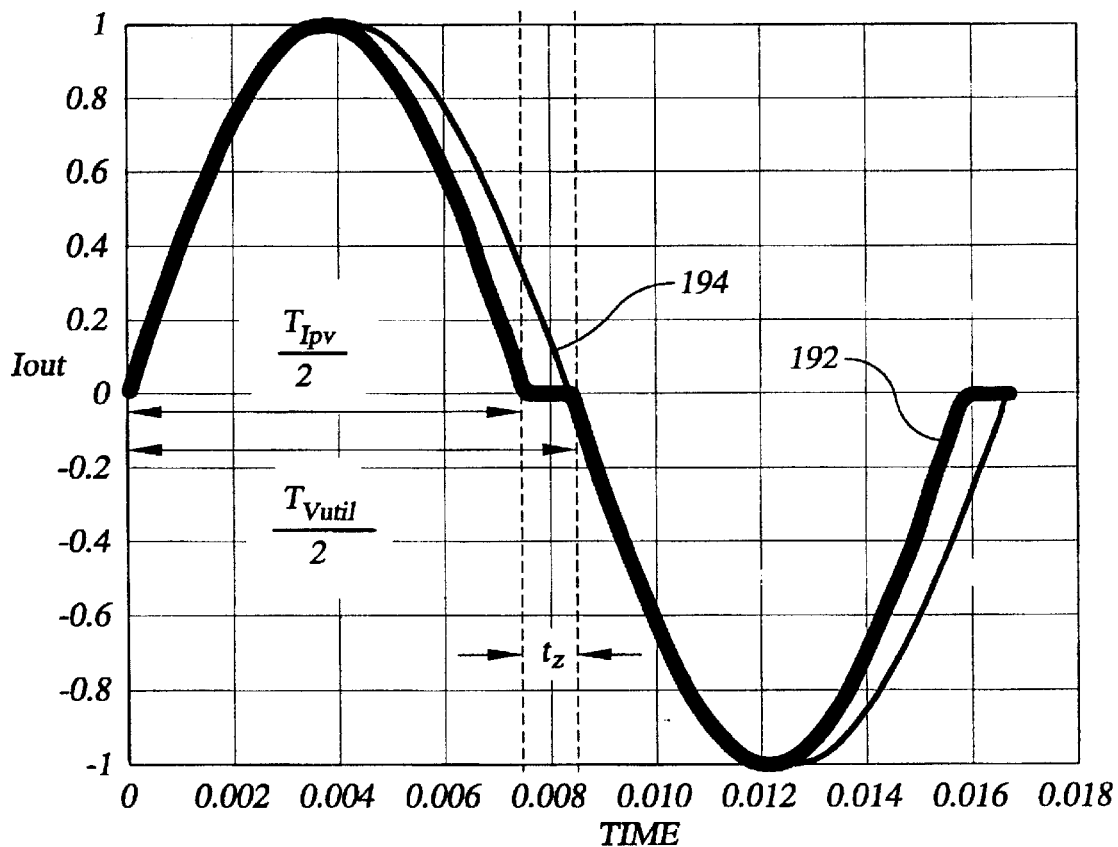
FIG. 9 is a graph depicting a wave form used to implement a representative AFD method of islanding prevention.

In the active frequency drift (AFD) method, the PV PCU uses a slightly distorted output current to cause the frequency of $v_a$ to drift up or down when the utility is disconnected. In FIG. 9, for example, a waveform 192 that implements upward frequency drift is shown, along with an undistorted sine wave 194 for comparison. $T_{v\ util}$ is the period of the utility voltage; $T_{ipv}$ is the period of the sinusoidal portion of the current output of the PV system; and $t_z$ is a dead or zero time. The ratio of $t_z$ to half the utility voltage period, $T_{v\ util}$, is referred to as the "chopping fraction" (cf). During the first portion of the first half-cycle, the PV system's current output is a sinusoid with a frequency slightly higher than that of the utility voltage. When the PV output current reaches zero, it remains at zero for time $t_z$ before beginning the second half cycle. For the first part of the second half-cycle, the PV output current is the negative half of the sine wave from the first half-cycle. When the PV current again reaches zero, it remains at zero until the rising zero crossing of the utility voltage. When we apply such a current waveform to a resistive load in the absence of a utility voltage, its voltage response will follow the distorted $i_{pv}$, and therefore $v_a$ will reach a rising zero crossing $t_z$ seconds before it would have had the utility still been connected. This is interpreted by the PV system as an increase in the frequency of $v_a$. The PV system then increases its frequency to attempt to maintain the relationships shown in FIG. 9. The resistive load again responds by advancing the negative to positive zero crossing of $v_a$ by $t_z$, which is again interpreted by the PV system as an increase in frequency, and this process continues until the frequency has drifted far enough from nominal to be detected by the OFR.

AFD also is highly effective in detecting a wide range of islanding conditions. However, it too has an NDZ. Recall from the OFR/UFR discussion that, if the local load is capacitive, the voltage frequency in the island will exhibit a tendency to decrease, partially counteracting the upward frequency drift of the PCU. If the percentage of zero time of the inverter output current is fixed, it has been shown experimentally that there will always be a particular value of capacitance which can be added to a resistive load that will result in a downward frequency drift that exactly cancels the upward frequency drift of the PCU, and under this condition islanding can continue indefinitely. Therefore, AFD is known to have an NDZ for such RC loads. However, it has recently been shown that AFD also has an NDZ for a range of parallel RLC loads. For such loads, a phase criterion for a stable steady state frequency (a limit cycle) for an AFD-equipped PCU can be written as follows:

$$\arg\{R^{-1}+(j\omega L)^{-1}+j\omega C\}^{-1}=-0.5\omega\cdot t_z=-0.5\pi\cdot cf \qquad [8]$$

where cf the chopping fraction defined previously. Once the system reaches this steady-state frequency, which will be slightly higher than the load's resonant frequency, no further frequency increase occurs. If the steady-state frequency lies within the trip thresholds of the OFR/UFR, and the magnitude, response of the RLC load is such that the voltage does not go beyond the OVR/UVR thresholds, islanding can continue indefinitely. This condition occurs for loads with a relatively large value of C (millifarads or larger) and relatively small values of L (millihenries or less), and for low-power loads (large value of R). AFD has an additional disadvantage in that it requires distorting the PCU's output current.

A preferred embodiment of an active frequency drift islanding prevention scheme with positive feedback (AFDPF) will now be described which overcomes many of the shortcomings of the prior art. It is shown herein that this new method and system is significantly more effective than AFD, and in fact can be made to be more effective than SMS, making AFDPF one of the most effective islanding prevention techniques presently available. Experimental corroboration of the modeling results shows that although the simplified models do not accurately predict the frequency-vs.-time behavior of the system, they do predict the location of the NDZ with reasonable accuracy. In addition, several real world concerns about the performance of AFDPF with respect to power quality are addressed, and finally it is shown that AFDPF is effective in the multi-inverter case, even if not all PCUs in the island use AFDPF.

Figure 10:
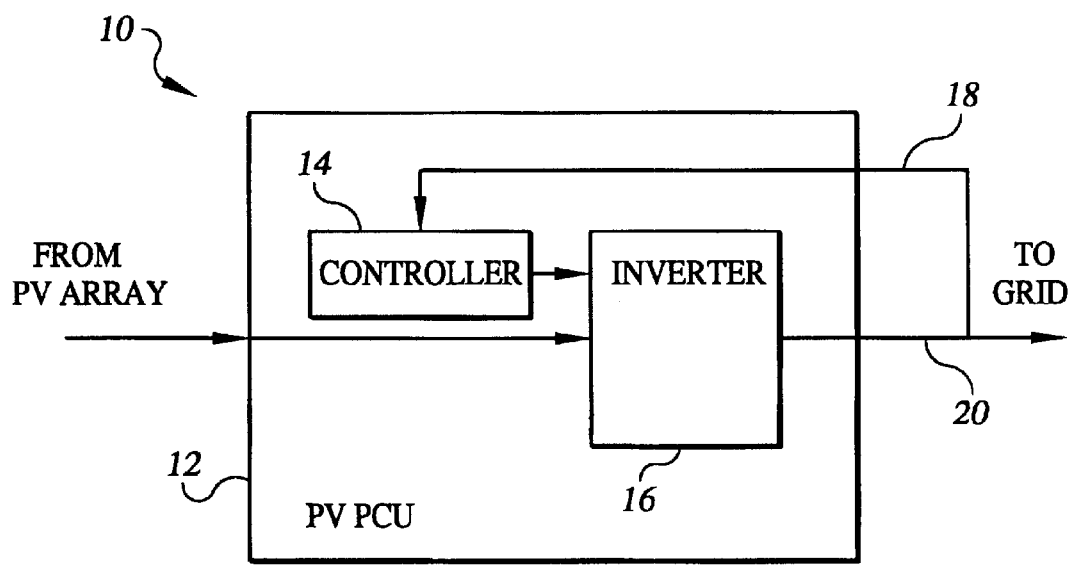
FIG. 10 is a schematic diagram depicting a preferred embodiment of the present invention.

As shown in FIG. 10, a preferred embodiment of the AFDPF system 10 of the present invention, such as for use in a PV system, incorporates a PV PCU 12 which includes a controller 14 and an inverter 16, which is adapted to provide power to a grid-connected load (not shown). Preferably, the controller receives positive feedback, such as through feedback line 18, from the feeder line 20. Once received, the controller utilizes the feedback to increase the cf of the PCU output signal with increasing deviation of the frequency of $v_a$ ($\omega$) away from nominal, as described in detail hereinafter. This functionality is referred to hereinafter as the "AFDPF process."

The AFDPF process of the present invention can be implemented in hardware, software, firmware, or a combination thereof In a preferred embodiment, however, the AFDPF process is implemented by the controller 14, which preferably is configured as a special purpose computing apparatus for implementing logical functions. The AFDPF process can be embodied in any computer-readable medium for use by or in connection with an instruction execution system, apparatus, or device, such as a computer-based system, processor-containing system, or other system that can fetch the instructions from the instruction execution system, apparatus, or device, and execute the instructions. In the context of this document, a "computer-readable medium" can be any means that can contain, store, communicate, propagate or transport the program for use by or in connection with the instruction execution system, apparatus, or device. The computer readable medium can be, for example, but not limited to, an electronic, magnetic, optical, electromagnetic, infrared, or semi-conductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable, programmable, read-only memory (EPROM or Flash memory) (magnetic), an optical fiber (optical), and a portable compact disk read-only memory (CDROM) (optical). Note that the computer-readable medium could even be paper or another suitable medium upon which the program is printed, as the program can be electronically captured, via for instance, optical scanning of the paper or other medium, then compiled, interpreted, or otherwise processed in a suitable manner, if necessary, and then stored in a computer memory.

Figure 11:
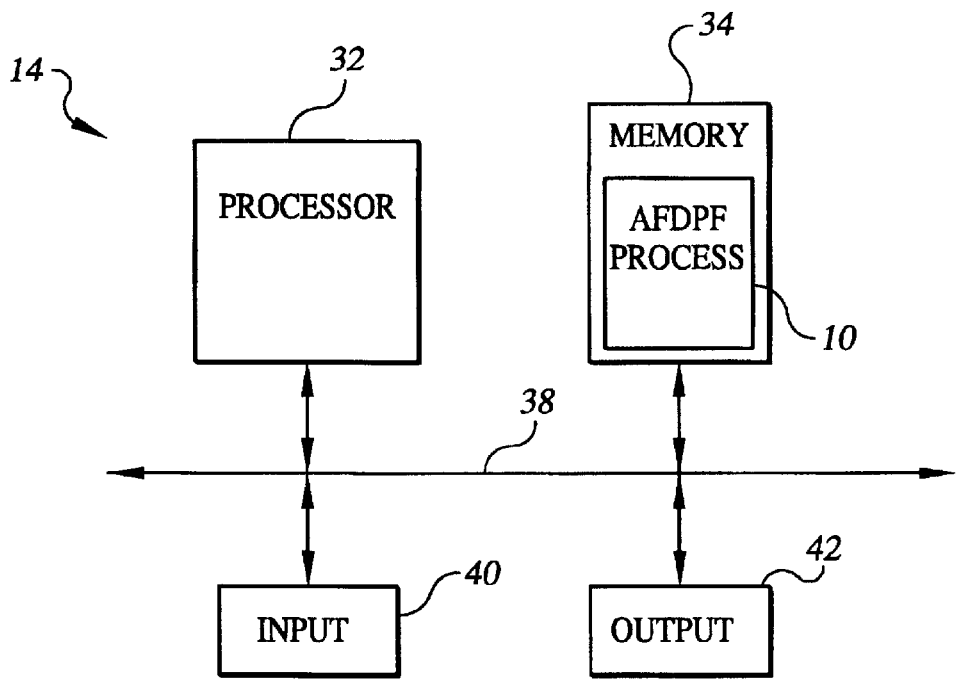
FIG. 11 is a schematic diagram depicting a preferred embodiment of the present invention.

FIG. 11 illustrates a preferred embodiment of the controller 14, i.e., a processor-based system, which may utilize the AFDPF process of the present invention. As shown in FIG. 11, a controller 14 generally comprises a processor 32 and a memory 34. Herein, the memory 34 may be any combination of volatile and nonvolatile memory elements, such as random access memory or read only memory. The processor 32 accepts instructions and data from memory 34 over a local interface 38, such as a bus(es). The controller also includes an input 40 and an output 42. The AFDPF process of the present invention, the functions of which shall be described hereinafter, preferably resides in memory 34 and is executed by the processor 32.

Figure 12:
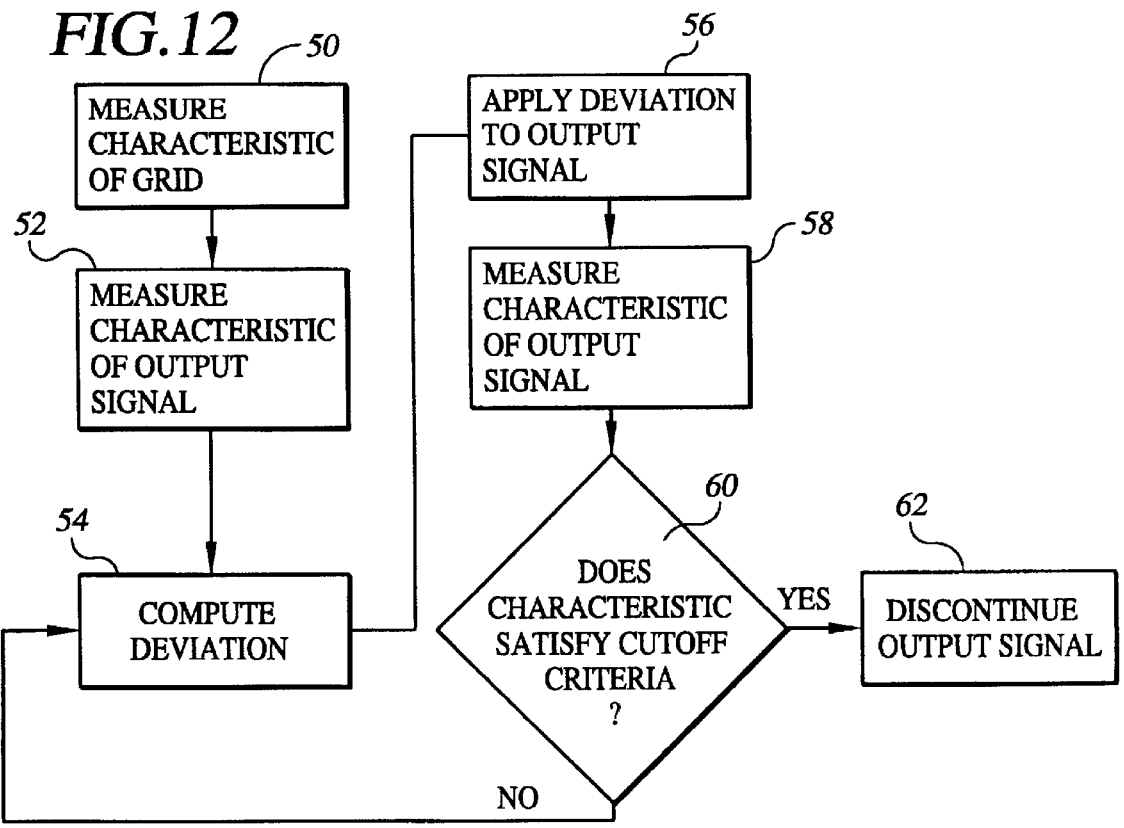
FIG. 12 is a flow diagram functionally demonstrating the steps performed by a preferred embodiment of the present invention.

The flow chart of FIG. 12 shows the functionality of a preferred implementation of the AFDPF system depicted in FIG. 10. In this regard, each block of the flow chart represents a module segment or portion of code which comprises one or more executable instructions for implementing the specified logical function or functions. It should also be noted that in some alternative implementations the functions noted in the various blocks may occur out of the order depicted in FIG. 12. For example, two blocks shown in succession in FIG. 12 may in fact be executed substantially concurrently where the blocks may sometimes be executed in the reverse order depending upon the functionality involved.

In the preferred embodiment depicted in FIG. 12, the AFDPF process begins at block 50 where the system measures a characteristic, such as frequency, of the grid. The system then proceeds to block 52, where the system measures a characteristic of the output signal of the PV PCU. The measurements obtained in blocks 50 and 52 preferably are stored in memory and then utilized in block 54 to compute any deviation between the grid and output signal characteristics. In block 56, the computed deviation is applied to the output signal of the PV PCU, as described in detail hereinafter, to produce a modified output signal. In block 58, the system then measures a characteristic of the modified output signal of the PV PCU. If it is determined, such as in block 60, that the modified output signal satisfies predetermined cutoff criteria, the output signal preferably is discontinued at the PV PCU (block 62). Such criteria may be established by the OFR/UFR of the PV PCU, for instance, the frequency of the output signal is greater than or equal to a predetermined frequency.

If, however, it is determined that the modified output signal does not satisfy the predetermined cutoff criteria, the system preferably returns to block 54 where the measured characteristic of the modified output signal (obtained in block 58) is compared to the measured characteristic of the grid so as to compute a deviation of the measured characteristics, if applicable. Preferably, the process then proceeds as described hereinbefore.

It should be noted that, although the preferred embodiments of the present invention discussed herein measure and modify output signal frequency, signal characteristics other than frequency may be utilized by the AFDPF system for preventing islanding. Such characteristics may include voltage and phase, with the output signal preferably being disconnected at the PV PCU by means of the OVR/UVR, for instance.

As described briefly hereinbefore, the AFDPF system utilizes positive feedback to increase the chopping fraction cf with increasing deviation of the frequency of $v_a(\omega)$ away from nominal:

$$cf_k = cf_{k-1} + F(\Delta\omega_k) \quad [9]$$

where $cf_{k-1}$ is the chopping fraction in the previous ($k-1^{th}$) cycle, and $F(\Delta\omega_k)$ is a function of the sampled frequency error $\Delta\omega_k = \omega_k - \omega_0$. The basic principle of AFDPF is that, when $\omega$ deviates from the nominal utility frequency $\omega_0$, cf is adjusted in such a way as to make the frequency deviation larger. This will prevent the frequency from leveling off as early as was the case with AFD. Thus, if the utility has been disconnected, this positive feedback on cf will cause $\Delta\omega_x$ to increase to a larger value than was the case with AFD, giving a greater chance of tripping the OFR/UFR. In order to clarify this, consider the following.

The AFDPF implementation shown in Equation [9] is called "cumulative AFDPF" because the deviation of cf away from cf$_0$ accumulates over time. This can be clearly seen by rewriting Equation [9] in the following form:

$$cf_k = cf_0 +$$

$$cf_k = cf_0 + \sum_{n=0}^{\infty} F(\Delta\omega_{k-n}) \quad [10]$$

$$F(\Delta\omega_{k-n}) \quad [10]$$

If the summation in Equation (10) is dropped ("non-cumulative AFDPF", which will be discussed in more detail in a later section):

$$cf_k = cf_0 + F(\Delta\omega_{k-n}) \quad [11]$$

then a phase criterion may be written:

$$\tan^{-1}\{R[\omega_k C - (1/\omega_k L)]\} = \pi/2[cf_0 + F(\omega_k - \omega_0)] \quad [12]$$

Equation [12] helps to clarify the action of AFDPF. With AFDPF, as the frequency $\omega_k$ deviates from $\omega_0$, the second term on the right side of Equation [12], the F term, increases in magnitude. Thus, the phase of the load on the left-hand side must increase even further to move toward the steady-state condition. This process continues, impeding the ability of the system to reach a steady state until much larger frequency deviations are attained. This results in a narrowing of the NDZ.

The function F may be any function which has the following property: F ($\Delta\omega_k$) should have the same sign as $\Delta\omega_k$. If a function were selected which did not have this property (for example, F $(\Delta\omega_k)=K (\Delta\omega_k)^2$, where K is a gain), then a negative frequency deviation would result in a positive cf deviation. This would result in negative, or regulating, feedback, which would act to increase run-on times.

One candidate for F ($\Delta\omega_k$) which has the above property plus the advantage of simplicity is a linear function:

$$cf_k = cf_{k-1} + K^*(\omega_k - \omega_0) \quad [13]$$

where K* is a gain (with units of sec/rad, for AFDPF as shown). This "linear AFDPF" will be the type of AFDPF studied and analyzed herein to demonstrate the effectiveness of the method; however, there is no intention to limit the invention to a linear function as other functions meeting the aforementioned same-sign property may also be utilized.

Figure 13:
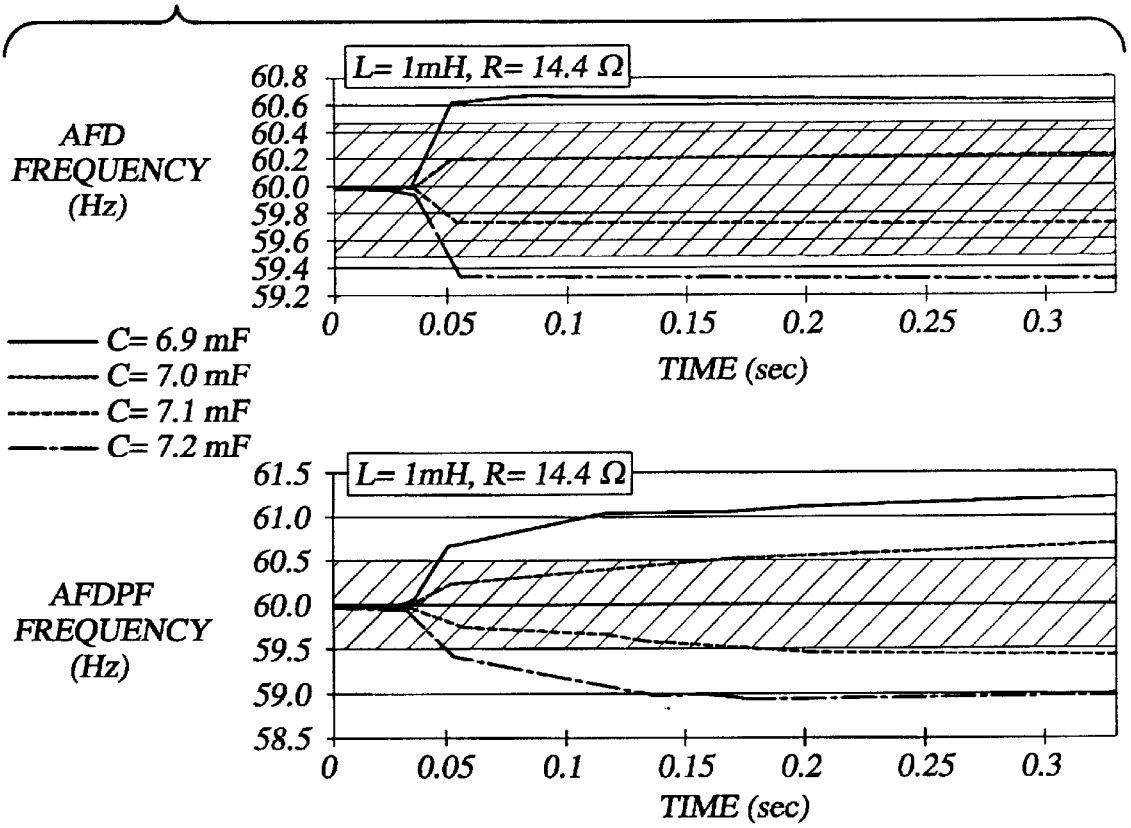
FIG. 13 is a compound graph comparing the implementation of representative AFD and AFDPF methods.

In order to investigate AFDPF and its advantages over AFD, linear cumulative AFDPF as defined by Equation [13] was incorporated into a time-domain simulation engine. The results of simulations performed using this model indicate clearly the operation of AFDPF, that it prevents the frequency of $v_a$ from leveling off. To show this clearly, the frequency-vs.-time results using K=0.1 Hz$^{-1}$, R=14.4$\Omega$, L=1 mH, and four values of C, are shown in FIG. 13. The upper panel shows the frequency vs. time of an AFD-equipped system with cf=5%. Recall that, for two of the four loads shown, the frequency of $v_a$ (note that f (Hz) is shown, not $\omega$(rad/sec)) levels off within the shaded region (the OFR/UFR NDZ), and AFD fails to prevent islanding. However, in the lower panel, the frequency vs. time behavior of an AFDPF-equipped system with the same loads and cf$_0$=5% is shown. With the addition of the positive feedback, the frequency of $v_a$ does not level off within the OFR/UFR NDZ for any of the loads shown. Therefore, AFDPF prevents islanding in cases in which AFD does not.

Figure 14:
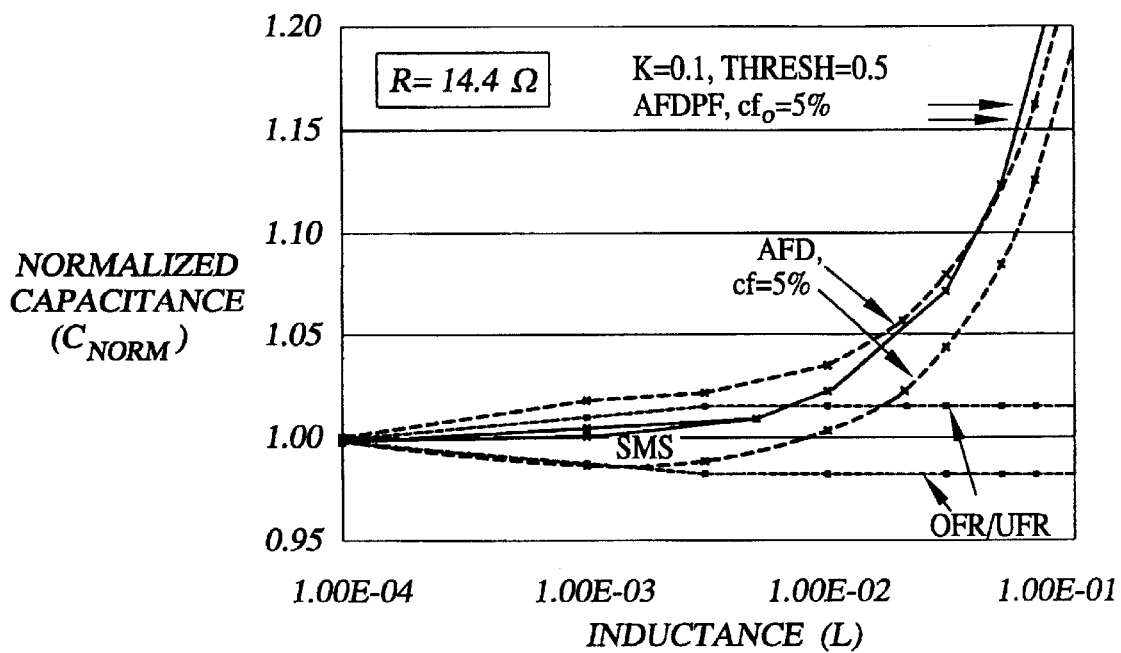
FIG. 14 is a graph depicting the NDZs of various islanding prevention methods.

The NDZ boundaries located by the above-described method are shown in FIG. 14, along with the NDZs of AFD, SMS, and the OFR/UFR. In these simulations, K=0.1 Hz$^{-1}$, R=14.4$\Omega$, and L=1 mH. Again, the action of AFDPF is apparent—adding positive feedback to AFD has reduced the width of its NDZ throughout the range of loads under consideration. It should be noted that linear AFDPF does still have an NDZ, but throughout the range of L shown, the range of capacitances that lead to nondetection for each inductance is significantly reduced.

Experimental Verification of the AFDPF Modeling Results

Figure 15:
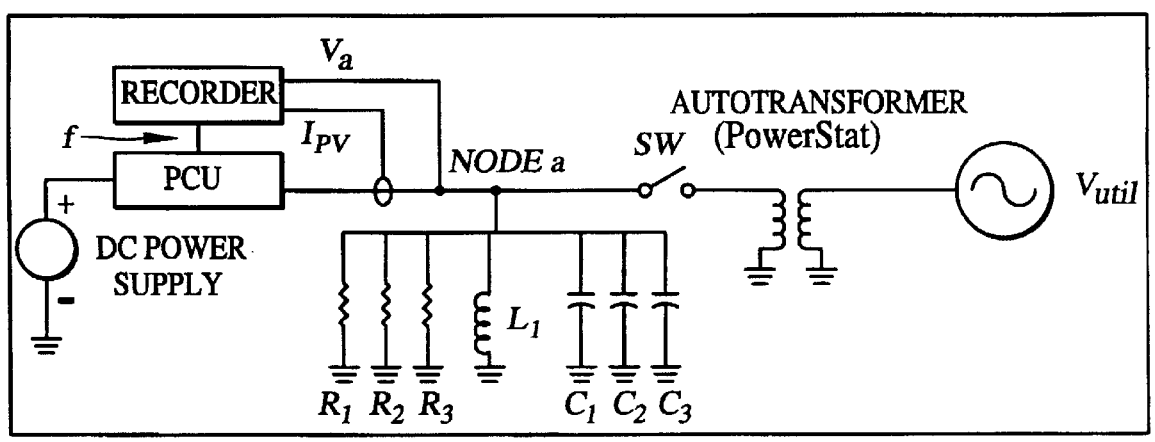
FIG. 15 is a schematic diagram depicting a representative islanding test set-up.

A series of experiments was carried out in order to obtain verification of the modeling procedure described hereinbefore. These experiments utilized an anti-islanding evaluation unit (AIEU) which was based upon a Sunshine PCU, manufactured by Sandia National Laboratories, and which is depicted schematically in FIG. 15. However, before undertaking the task of experimental verification, let us summarize briefly what the models have shown and what the experiments can be expected to demonstrate.

1) The NDZ of AFDPF, like that of AFD, becomes wider as L decreases and C increases; that is, the effectiveness of AFDPF decreases with increasing C and decreasing L values (FIG. 14). Another way of viewing this prediction is that it should be easier in an experimental setting to find loads which produce long run-on times when L is small and C is large. If L is large and C is small, the NDZ becomes so narrow that it would be difficult to match the experimental load parameters to those of the NDZ loads with sufficient precision. Therefore, it is expected that longer run-on times will be found for loads with small L and large C.

2) The NDZ of AFDPF, like that of AFD, becomes wider as the value of R increases; that is, the effectiveness of AFDPF decreases as the value of R increases. Again considering the implications of this prediction from a practical standpoint, it is expected that it will be easier to make the PCU run on when the real power consumption of the load is low. Thus, it is expected that longer run-on times will be measured for loads with low values of R than for higher-power loads.

3) The NDZ of AFDPF, like that of AFD, bends into the leading-dpf load range ($C_{norm}>1$) when there is a nonzero cf$_0$ (FIG. 14). Therefore, as the value of L is increased, it is expected that the $C_{norm}$ at which run-on times are longest will also increase.

In order to test whether these general predictions are in fact representative of the behavior of the real system, the following experiment was designed:

1) Deactivate all islanding prevention methods other than SFS (the OFR/UFR/OVR/UVR are not switchable; these are always active).

2) Select RLC loads according to the following table:

TABLE 1

| R | L | C |
|---|---|---|
| "high" (>110 Ω) | "high" (>300 mH) | Sweep over the range $0.8 \leq C_{norm} \leq 1.2$ |
| "low" (<70 Ω) | "high" (>300 mH) | Sweep over the range $0.8 \leq C_{norm} \leq 1.2$ |
| "high" (>110 Ω) | "low" (<50 mH) | Sweep over the range $0.8 \leq C_{norm} \leq 1.2$ |
| "low" (<70 Ω) | "low" (<50 mH) | Sweep over the range $0.8 \leq C_{norm} \leq 1.2$ |

3) Run a series of four tests. For the first and second tests, L will be fixed at its "high" value. In the first test, an R ("high") will be chosen, and $C_{norm}$ will be swept over the prescribed range. In the second test, R will be changed to its "low" value, and $C_{norm}$ will again be swept over the prescribed range. For the third and fourth tests, L will be set to its "low" value. In the third test, R will be returned to its "high" value (or a value as near it as allowed by practical considerations), and $C_{norm}$ will again be swept, and in the fourth test R will be set to its "low" value, and $C_{norm}$ will again be swept. In this way, all combinations of R, L and $C_{norm}$ will be tested.

4) For each test, in each line cycle, record frequency of $v_a$ magnitude or RMS of $v_a$ the length of the run-on, and PCU current output. The actual load parameters used in the experiment are given in Table 2.

TABLE 2

| R (Ω) | L(mH) | C (μF) | Max run-on time | $C_{norm}$ at which max run-on happens |
|---|---|---|---|---|
| 108.1 | 96.6 | 67.5, 69.5, 70.5, 71.22, 72.22, 73.22, 74.22, 75 | | |
| 73.4 | 96.6 | 67.5, 69.5, 70.5, 71.22, 72.22, 73.22, 74.22, 75 | | |
| 134.4 | 345.4 | 19.72, 19.97, 20.22, 20.267, 20.72, 20.967, 21.22, 21.467, 21.72, 21.967, 22.22 | | |
| 71.7 | 345.4 | 19.72, 19.97, 20.22, 20.267, 20.72, 20.967, 21.22, 21.467, 21.72, 21.967, 22.22 | | |

Figure 16:
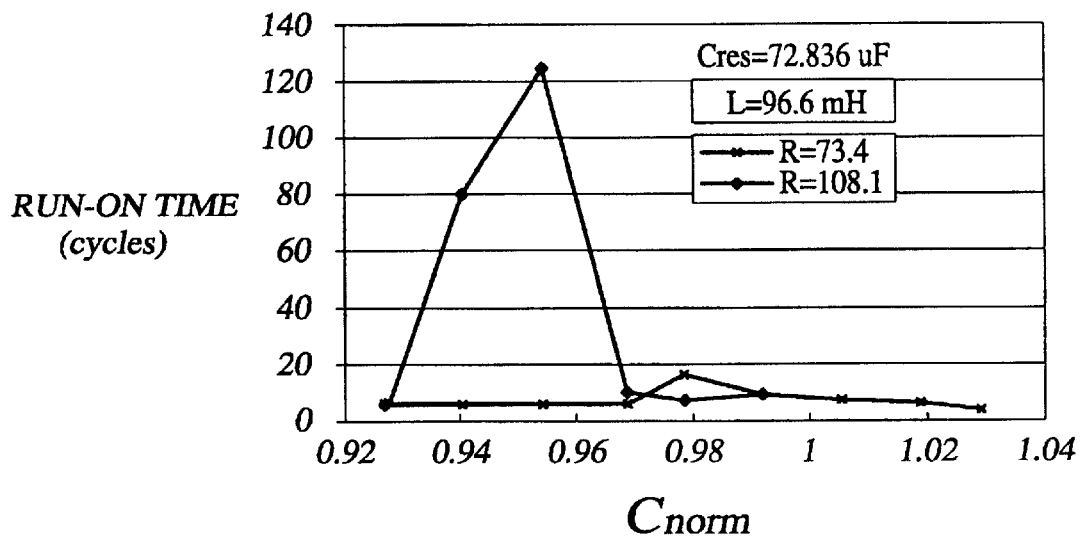
FIG. 16 is a graph depicting run-on time of a representative AIEU as a function of $C_{norm}$ for two values of load resistance.
Figure 17:
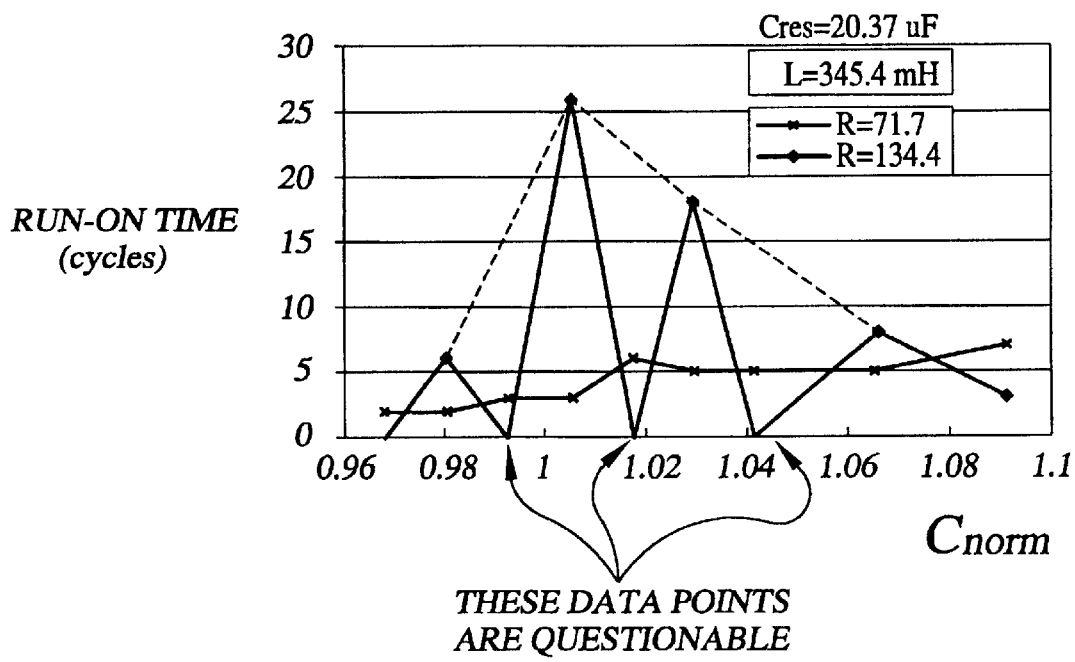
FIG. 17 is a graph depicting run-on time of a representative AIEU as a function of $C_{norm}$ for two values of load resistance.
Figure 18:
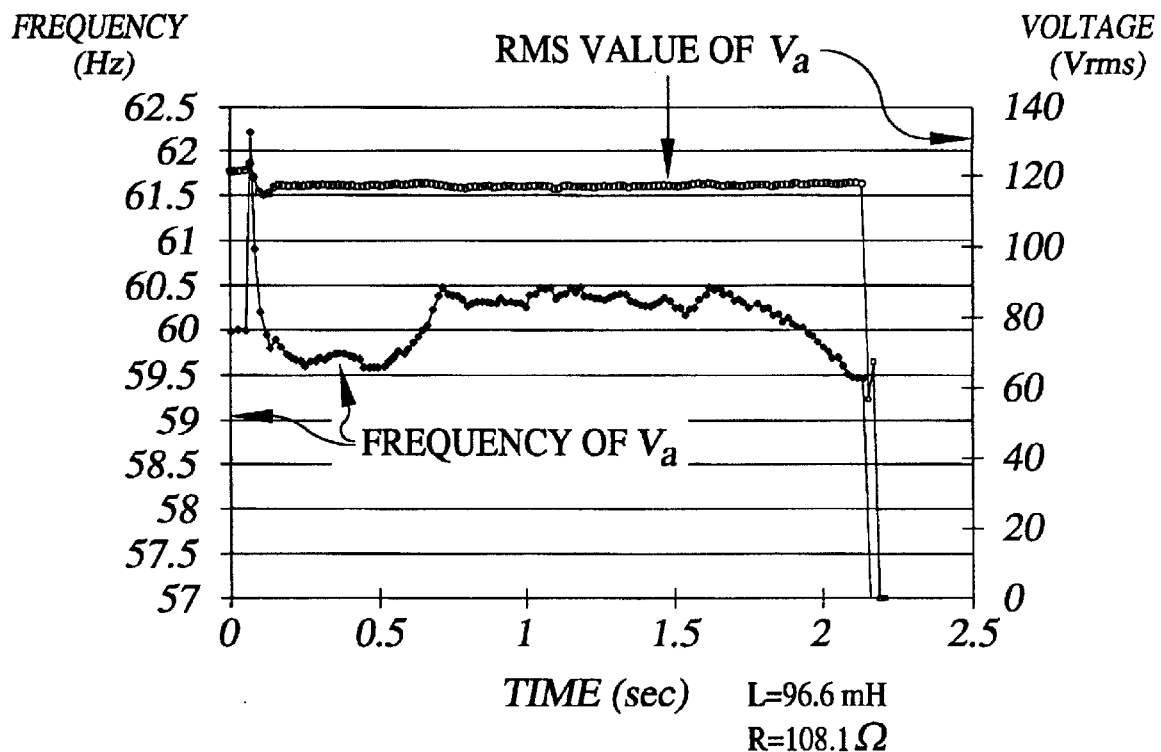
Figure 19:
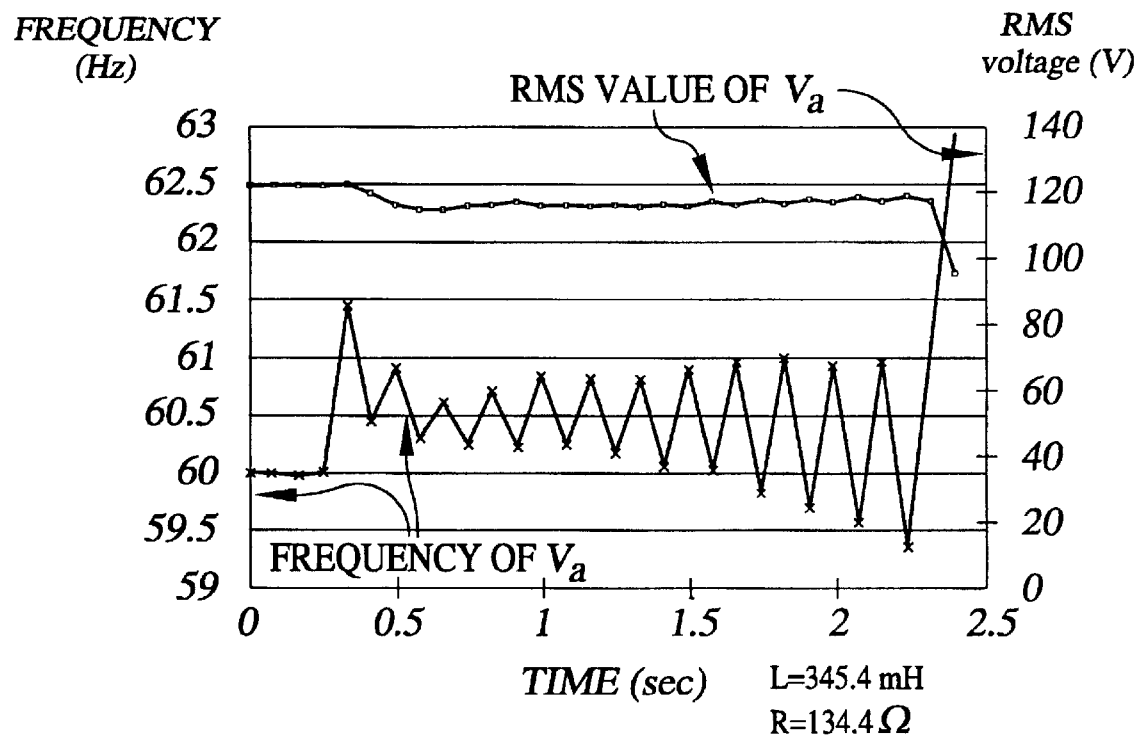

Unfortunately, the available values of L in the laboratory setup did not meet the requirements set forth in the experimental plan, but the inductances used represent the largest available span of L values. The measured run-on times of the AIEU as functions of $C_{norm}$ are shown in FIGS. 16 and 17. Each figure shows the results for one value of inductance, and in each figure there are two curves, each corresponding to a different value of resistance. In addition, in FIG. 18, the frequency-vs.-time and voltage-vs.-time behavior of the AFDPF-equipped system with L=96.6 mH, C=69.5 μF, and R=108.1Ω is plotted, and in FIG. 19 the same plots are shown for a load with L=345.4 mH, C=20.467 μF, and R=134.4Ω. Finally, the run-on time data is consolidated in the three-dimensional chart plotted in FIG. 20 as functions of R (high or low) and L (high or low). Note that this chart was plotted using four data points (at the corners of the surface).

Figure 20:
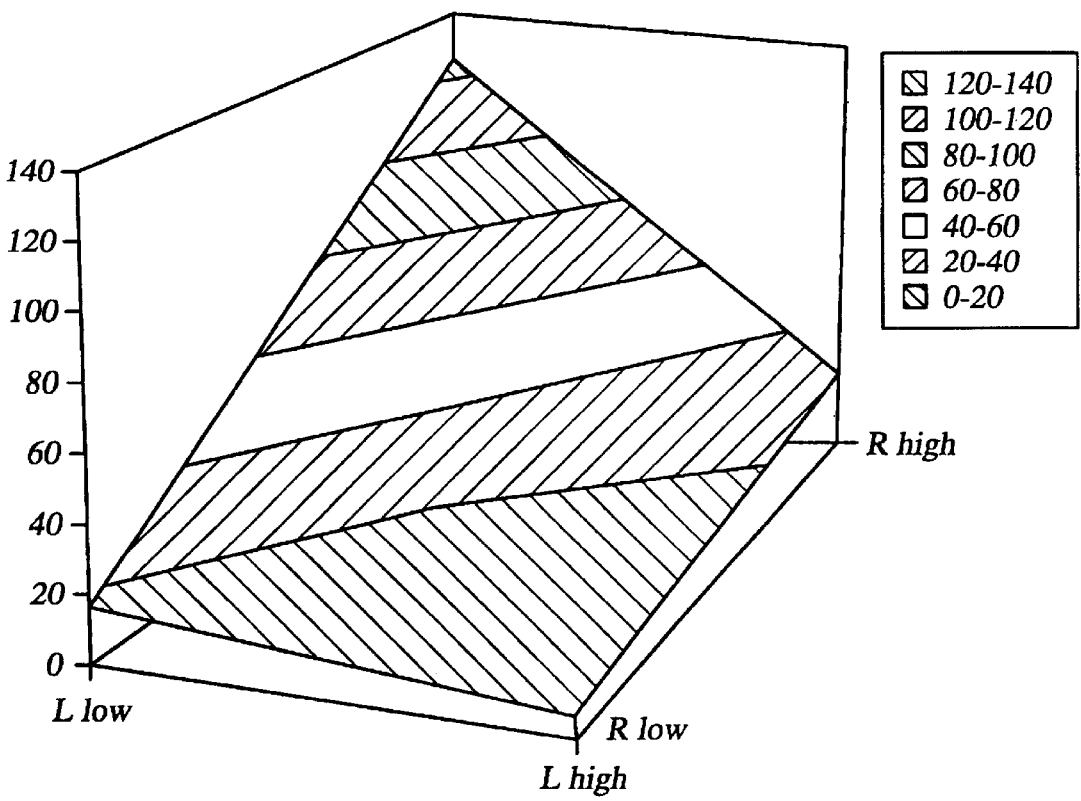
FIG. 20 is a three-dimensional graph depicting trends and maximum run-on times as functions of R and L of the RLC load.

The plots of run-on times in FIGS. 16 and 17, and the 3-D chart of the data in FIG. 20 offer many significant insights. First and foremost, the data shows that the following behaviors are correctly predicted by the model:

1) Longer run-on times were obtained for loads with large values of C and small values of L, and that were near resonance at $\omega_0$. This corroborates the expected narrowing of the NDZ of AFDPF at larger values of L and smaller values of C.
2) Longer run-on times were observed for low-power loads than for high-power loads. This verifies the finding that the NDZ of AFDPF is narrower for high-power loads.
3) The value of $C_{norm}$ at which the longest run-on times are obtained increased as L increased. This illustrates that the NDZ of AFDPF does in fact bend upward under the influence of a small amount of frequency bias (nonzero $cf_0$).

Further validation of the models indicated that the worst-case loads observed during the anti-islanding experiments were loads with small inductors, large resistors, large capacitors, and dpfs very near unity. Therefore, the predictions of the location of the NDZ of AFDPF seem to be well-supported by the experimental evidence. The model has demonstrated significant value in determining the locations of the worst-case loads in RLC space, significant because it can serve as a guide for experimentation and also as an aid for developing a test of the islanding protection of PV PCUs.

However, as was indicated previously, the experimental data also indicates some weaknesses of the models used in this work. Note in FIGS. 18 and 19 that the frequency-vs.-time behavior is very different from that predicted by the models as plotted in FIG. 10. For the small-L, big-C case shown in FIG. 18, there is a significant initial transient in frequency, followed by a "meandering" behavior until the PCU finally trips on underfrequency. (The system actually runs on for more than 2 seconds, indicating that for this load it does not meet the specifications called for in IEEE-P929). Even more surprising is the behavior seen in the big-L, small-C case in FIG. 19, in which the frequency measurement actually oscillates before finally shutting down. This is significant because it appears that at larger inductances and smaller capacitances, the behavior of the AIEU may be dominated by mechanisms not accounted for in the modeling. However, it is believed that the oscillation itself is specific to the AIEU, and is not an inherent property of AFDPF. Furthermore, note the fact that the oscillation is slowly growing in amplitude. This growing amplitude is believed to be because of the presence of the positive feedback; in other words, if the system were using AFD and not AFDPF, the oscillation would be expected to be much more constant in amplitude, and run-on times would be much longer. Because the positive feedback makes the system less stable, it is not believed that this oscillation could increase run-on times so significantly as to change the predicted NDZ location.

Note also that in FIG. 16 the maximum run-on times are obtained for loads with $C_{norm}<1$; that is, loads which are slightly inductive, and slightly off of resonance. It is suspected that this is an indication of the influence on the load of the large capacitors in the output of the AIEU, an influence which is not included in the model. In fact, the PCU itself seems to contribute some amount of capacitance to the load, or equivalently the PCU is capable of supplying a significant amount of reactive power to the load. This would have the effect of offsetting the NDZ of AFDPF to lower values of $C_{norm}$. A second peculiarity is evident in FIG. 17. Note that several of the data points are marked as "questionable." This is because in each case a sharp upward frequency transient like that shown in FIG. 18, tripped the PCU immediately when the switch was thrown to form the island. Clearly, these points do not illustrate the behavior of AFDPF, but they are important because they illustrate that such transients are in fact possible and can significantly impact the behavior of the system in some cases.

Based on the foregoing, it may be concluded that the NDZ results indicate that AFDPF is among the most effective islanding prevention methods available, in terms of its ability to prevent islanding. The addition of positive feedback leads to dramatic improvements over the performance of AFD. The width of the AFDPF NDZ ("width" being defined as the difference between the capacitances at the NDZ boundaries for a given value of L) can be at least an order of magnitude less than the width of the AFD NDZ, and for L>about 1 mH, the AFDPF NDZ can be orders of magnitude narrower than that of AFD.

An examination of FIG. 13 indicates that AFDPF has significant advantages over SMS as well. In particular, in the "midrange" of inductances between about 1 and 100 mH, the NDZ of AFDPF is narrower than that of SMS. At larger L values, AFDPF has an NDZ where SMS does not, but this NDZ is extremely narrow, and if a nonzero $cf_0$ is used it lies in a range of leading-dpf loads ($C_{norm}$<1), which are much less likely in practice than lagging-dpf loads ($C_{norm}$<1).

Effect of AFDPF on PCU Output Power Quality: Distortion of $i_{pv}$

Figure 21:
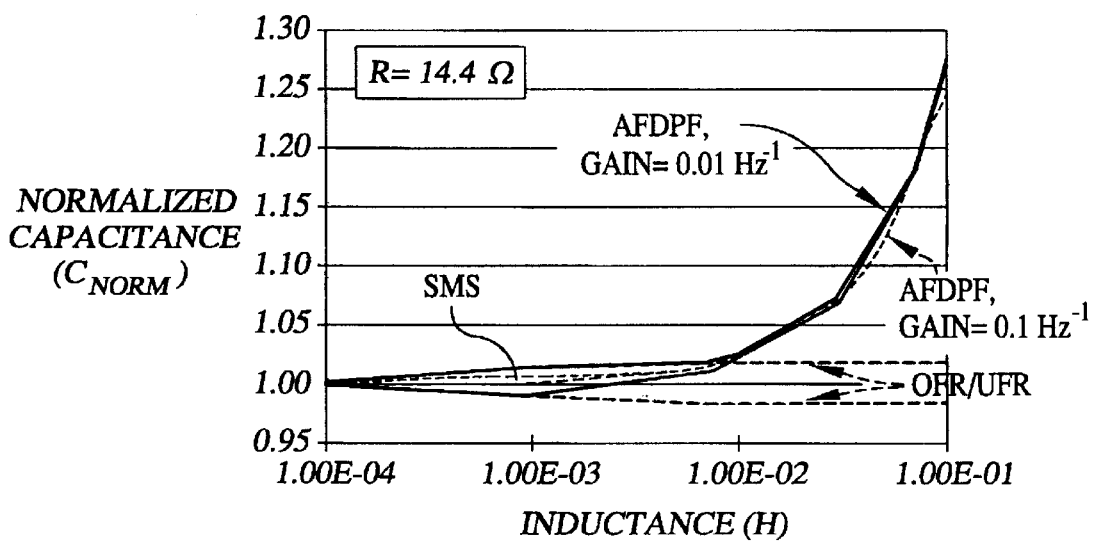
FIG. 21 is a graph depicting the NDZ of several islanding prevention methods.

Under normal operating conditions (with the utility connected), the PCU will periodically detect deviations in ω. These deviations could be caused by switching of large loads, particularly large loads with low dpfs, or by the switching of large utility reactances; nonlinear load components that inject sufficient harmonic current to lead to appreciable distortion of $v_a$; and noise and other disturbances, both in the system itself fluctuate while the utility is still connected, and this will increase the amount of distortion in $i_{pv}$. Therefore, AFDPF will always cause greater output distortion than would AFD with the same starting value of cf. Since typically it is required to keep the total harmonic distortion of the instantaneous system output current (THDipv) below 5%, the fact that AFDPF increases THDipv will impose a limit on how large the positive feedback gain can be. Instead of reducing the gain, one might impose a threshold on cf so that it would saturate at some value chosen to keep THDipv within limits. However, either of these approaches will also reduce the islanding detection effectiveness by widening the NDZ. The effect of reducing the gain on NDZ size is demonstrated in FIG. 21. The NDZ for a gain of 0.1 Hz$^{-1}$, which is the one plotted in FIG. 21 is compared with the AFDPF NDZ with a gain of 0.01 Hz$^{-1}$. In both cases $cf_0$=5%.

Another practical consideration that impacts THDipv must be introduced at this time. Consider a case in which the frequency of $v_a$, ω, is perturbed in one direction or the other but returns to zero without a deflection in the opposite direction. In this case, AFDPF as presented in Equation [13] would alter its value of cf but would never return to the original value. If several such deflections occurred, this could lead to large values of $cf_k$ and correspondingly large values of THDipv. To prevent this, some mechanism should be provided that causes $cf_k$ to return to $cf_o$ when several cycles pass without any deviation in ω. Such a mechanism has been referred to as "centering" or "forgetting." This mechanism may take any of several forms. One is simple forgetting, in which older values of $cf_k$ are multiplied by a coefficient that decreases as the $cf_k$ values become older. Note that Equation [13] may be rewritten as:

$$cf_k = cf_0 + K^* \sum_{n=1}^{\infty} [(\omega_{k-n} - \omega_0)] \quad [14]$$

To implement simple forgetting, all that is required is to multiply the summation term by a "forgetting factor" (FF) which decreases as the index n increases:

$$cf_k = cf_0 + K^* \sum_{n=1}^{\infty} FF_n \cdot [(\omega_{k-n} - \omega_0)] \quad [15]$$

$$FF_n \cdot [(\omega_{k-n} - \omega_0)] \quad [15]$$

where FF may be 1/n, exp(−n), or any similar factor. An alternative to using FF would be to use an AFDPF function in which $cf_k$ does not depend on $cf_{k-1}$:

$$cf_k = cf_0 + K^*(\omega_k - \omega_0) \quad [16]$$

This is "non-cumulative" AFDPF, which the reader will recall was used earlier in the derivation of an AFDPF phase criterion. Non-cumulative linear AFDPF is much simpler than AFDPF with forgetting, but it has a wider NDZ unless K is fairly large.

Another third alternative would be to use a sliding window, so that AFDPF uses only a finite number of past $cf_k$ values:

$$cf_k = cf_0 + K^* \sum_{n=1}^{N} [(\omega_{k-n} - \omega_0)] \quad [17]$$

This alternative is more effective than non-cumulative AFDPF but requires less computing power than using forgetting factors. As described herein, both the non-cumulative and sliding window approaches were investigated. If the sliding window used is fairly long (N>about 30), the NDZ of AFDPF with the sliding window is practically identical to that of cumulative AFDPF. Also, at the high gains used herein, the NDZ of noncumulative AFDPF is nearly the same as that of cumulative AFDPF, but the difference becomes larger at smaller gains.

The maximum allowable value of the gain is a complex function of several mechanisms that are not considered in the models presented here. A maximum gain of 0.1 Hz$^{-1}$ has been used in the linear AFDPF demonstrated herein. This value was derived by assuming that the maximum allowable frequency deviation is 0.5 Hz (larger frequency deviations would trip the OFR/UVR). Since to maintain THDipv of less than 5% it is required to keep cf less than 5%, the gain is selected such that the maximum frequency deviation of 0.5 Hz leads to a cf of 0.05, or 0.1 Hz$^{-1}$. This assumes that $cf_0$=0, and that "centering" has been employed. However, in practice, the true maximum gain allowable would need to be determined by testing of the PCU.

Effect of AFDPF on PCU Output Power Quality: System Transient Response

In general, the utility voltage source, as seen from node a (i.e., FIG. 1), is not an ideal voltage source with zero impedance. In particular, the transformers used to step the distribution voltage down to household voltage have non-negligible series resistance and inductance. Since the series impedance of distribution lines is in general very small, the transformer impedances dominate the source impedance as seen from the point of common coupling.

Figure 22:
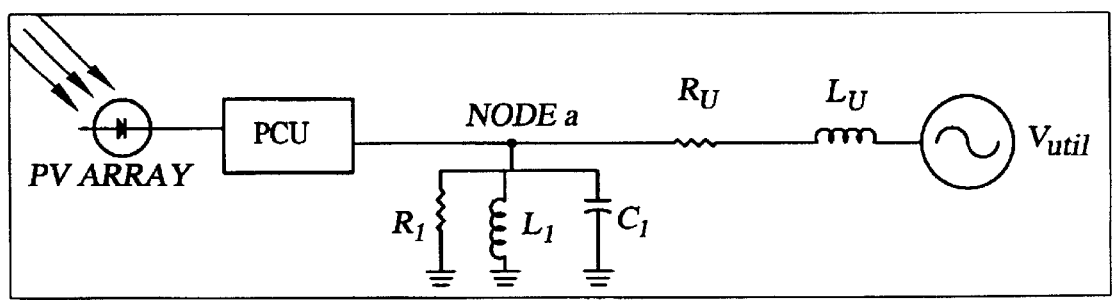
FIG. 22 is a schematic diagram depicting a representative PV-load-utility system showing utility series impedances.
Figure 23:
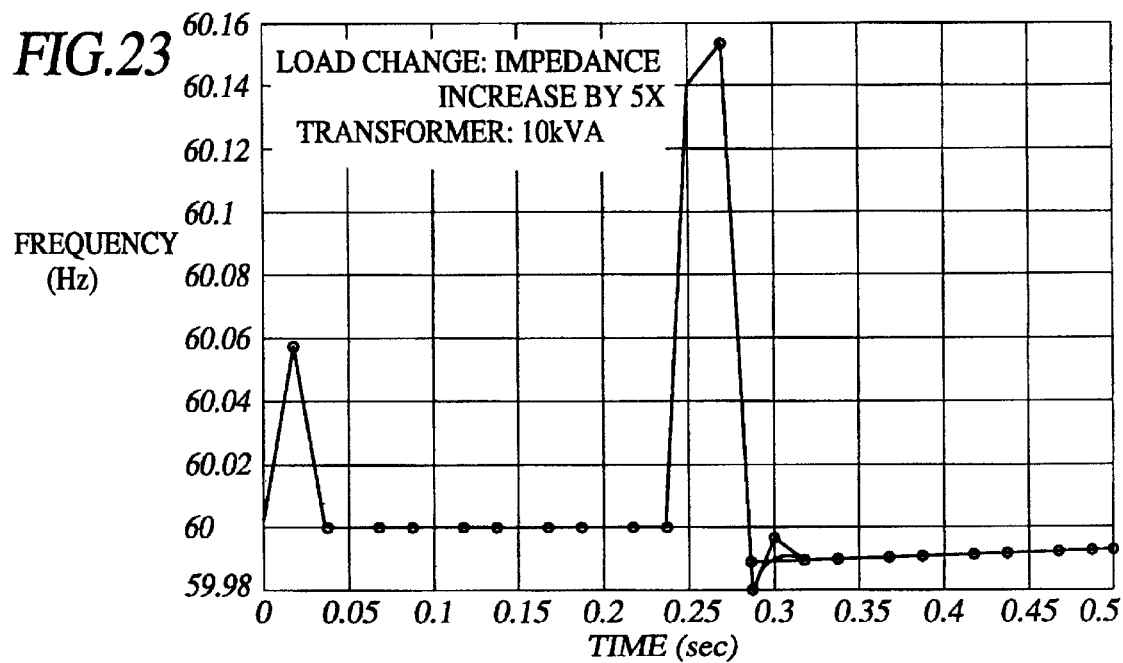
FIG. 23 is a graph depicting frequency of the $V_a$ versus time showing the effect of a step change in the RLC load.
Figure 24:
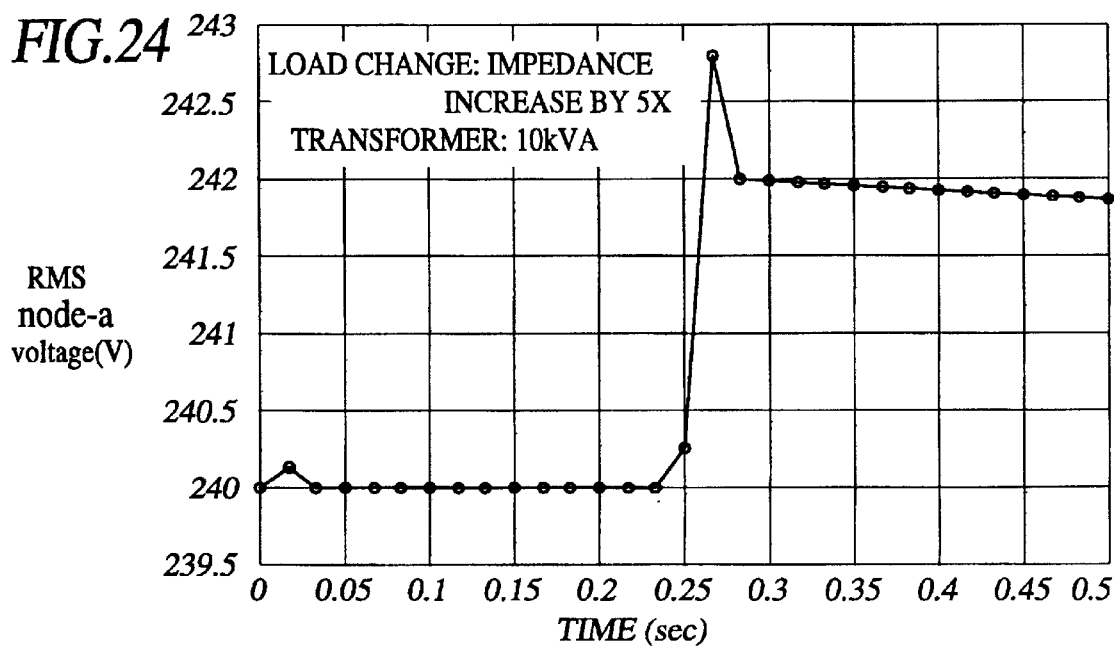
FIG. 24 is a graph depicting RMS value of $V_a$ versus time showing the effect of a step change in the RLC load.
Figure 25:
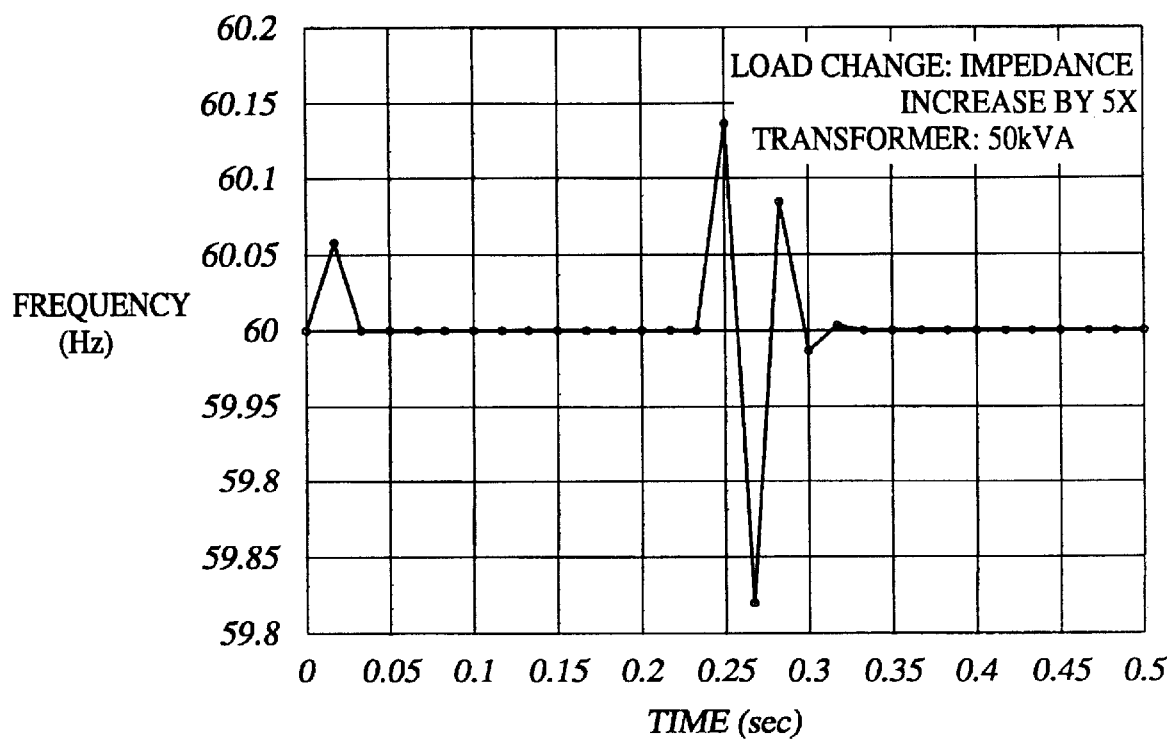
FIG. 25 is a graph depicting frequency of $V_a$ versus time showing the effect of a step change in the RLC load.
Figure 26:
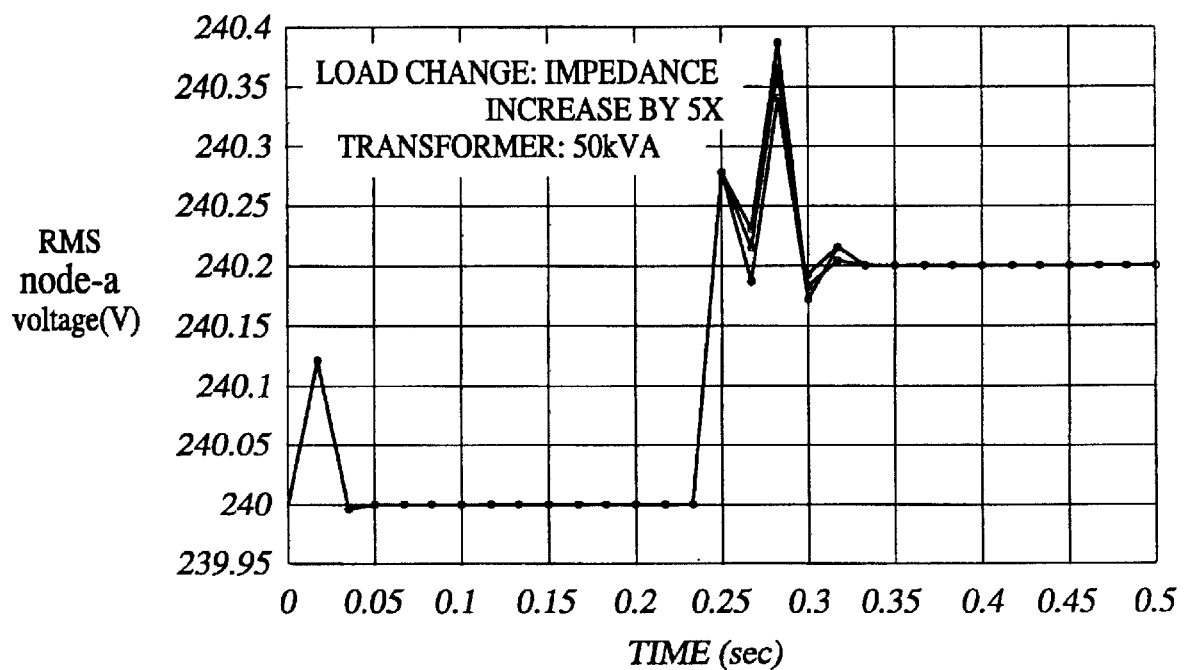
FIG. 26 is a graph depicting RMS value of $V_a$ versus time showing the effect of a step change in the RLC load.

Consider the system configuration shown in FIG. 22. This is the now-familiar PV-load-utility interconnected system, except that this time the impedance of the utility source is explicitly shown. When large loads switch on or off, $v_a$ will, in general, exhibit a short transient. The magnitude and settling time of this transient will depend primarily on the size of the change in the load, and on the impedance of the utility voltage source. If the PV PCU in FIG. 22 were equipped with AFDPF, it would react in such a way as to increase the magnitude of the frequency transient. Therefore, the potential impact of AFDPF on the system transient response must be investigated.

To model the system in FIG. 22, a state-space model was used. The load inductor current $i_{Ll}$, the load capacitor voltage $v_{Cl}$, and the utility inductor current $i_{Lu}$ were selected as the state variables, resulting in a third-order system:

$$\begin{bmatrix} x_1 \\ x_2 \\ x_3 \end{bmatrix} = \begin{bmatrix} i_{Ll} \\ v_{Cl} \\ i_{Lu} \end{bmatrix} \qquad [18]$$

The derivatives of the state variables are:

$$\begin{bmatrix} \dot{x}_1 \\ \dot{x}_2 \\ \dot{x}_3 \end{bmatrix} = \begin{bmatrix} \dfrac{di_{Ll}}{dt} \\ \dfrac{dv_{Cl}}{dt} \\ \dfrac{di_{Lu}}{dt} \end{bmatrix} = \begin{bmatrix} \dfrac{1}{L_l} v_{Ll} \\ \dfrac{1}{C_l} i_{Cl} \\ \dfrac{1}{L_u} v_{Lu} \end{bmatrix} \qquad [19]$$

To derive the state equations, Kirchoff's Current and Voltage Laws are used to analyze the system and solve for $v_{Ll}$, $i_{Cs}$, and $v_{Lu}$ in terms of linear combinations of the state variables:

$$\dot{x}_1 = \frac{1}{L_l} x_2 \qquad [20]$$

$$\dot{x}_2 = \frac{1}{C_l}\left(-x_1 - \frac{1}{R_l} x_2 + x_3 + i_{PV}\right)$$

$$\dot{x}_3 = \frac{1}{L_u}(-x_2 - x_3 R_u - v_{util})$$

Equation [20] can be written in the matrix form $\dot{x}=Ax+Bu$, where:

$$A = \begin{bmatrix} 0 & \dfrac{1}{L_l} & 0 \\ -\dfrac{1}{C_l} & -\dfrac{1}{R_l C_l} & \dfrac{1}{C_l} \\ 0 & -\dfrac{1}{L_u} & -\dfrac{R_u}{L_u} \end{bmatrix}; \qquad [21]$$

$$B = \begin{bmatrix} 0 & 0 \\ \dfrac{1}{C_l} & 0 \\ 0 & \dfrac{1}{L_u} \end{bmatrix};$$

$$u = \begin{bmatrix} i_{PV} \\ v_{util} \end{bmatrix}$$

To simulate the switching of a large load, a step change in load was utilized in which the load impedance increases by a factor of five. The load parameters used are listed in Table 3 hereinafter. This simulates the turning off of a high-power load. In each simulation, the step change occurred at t=0.25 sec (30 line cycles). The PV system output power was matched to the original load power (before the step change).

TABLE 3

| Parameter | Initial value | At step changes, value changes to |
|---|---|---|
| R | 14.4 Ω | 72 Ω |
| L | 10 mH | 50 mH |
| C | 703.6 μF | 140.7 μF |

It has been previously noted that, in general, the utility source impedance is dominated by the series impedance of the pole-mounted transformer used to step the distribution voltage down to customer-level voltage. However, this impedance depends on the size (i.e., power rating) of the transformer and on the voltages at its windings. In order to model the utility source impedance realistically, parameter values for commonly used transformers were supplied by a manufacturer. These values are listed in Table 4 hereinafter. Finally, simulations were performed using four different values of AFDPF gain, namely 0, 0.001, 0.01, and 0.1. In all simulations, $cf_0=0$. To summarize: a total of twenty simulations were performed. For each of the five transformers in Table 4, simulations were run using each of the four gains. In all simulations, the step change in the load was of the same magnitude (increased by 5×) and at the same time (t=0.25 sec).

TABLE 4

| Transformer power rating (kVA) | R (mΩ) | L (μH) |
|---|---|---|
| 10 | 135 | 169 |
| 15 | 77.3 | 162 |
| 25 | 36.3 | 115 |
| 37.5 | 22.2 | 100 |
| 50 | 15.0 | 57 |

Examples of the results of these simulations for the smallest and largest transformers are shown in FIGS. 23–26. The most important result of these simulations is that in no case does AFDPF cause the transient to be significantly larger than it would be without AFDPF (the zero gain case). This is evident from the fact that in all four figures all four curves lie essentially atop one another. Therefore, this modeling suggests that the effects of AFDPF on the system's transient response will be negligible. However, one interesting point to note is that the effect of AFDPF on the transient response is greater for the lower-impedance (higher-power) transformer. This, at first, seems somewhat counterintuitive; one might expect that a higher utility source impedance would lead to larger problems. However, apparently the higher impedance of the lower-powered transformer serves to damp the oscillations introduced by the AFDPF-equipped PCU, and this damping effect is reduced as the utility source impedance decreases. (Note: the slight "jump" at the beginning of each simulation is due to a small mismatch between the initial conditions used and those required for a correct steady-state startup. Exact determination of the true steady-state initial conditions proved to be very difficult, but the match achieved is actually very close, as indicated by the fact that the "jump" is very small in all cases.)

Effectiveness of AFDPF in the Multiple Inverter Case

Figure 27:
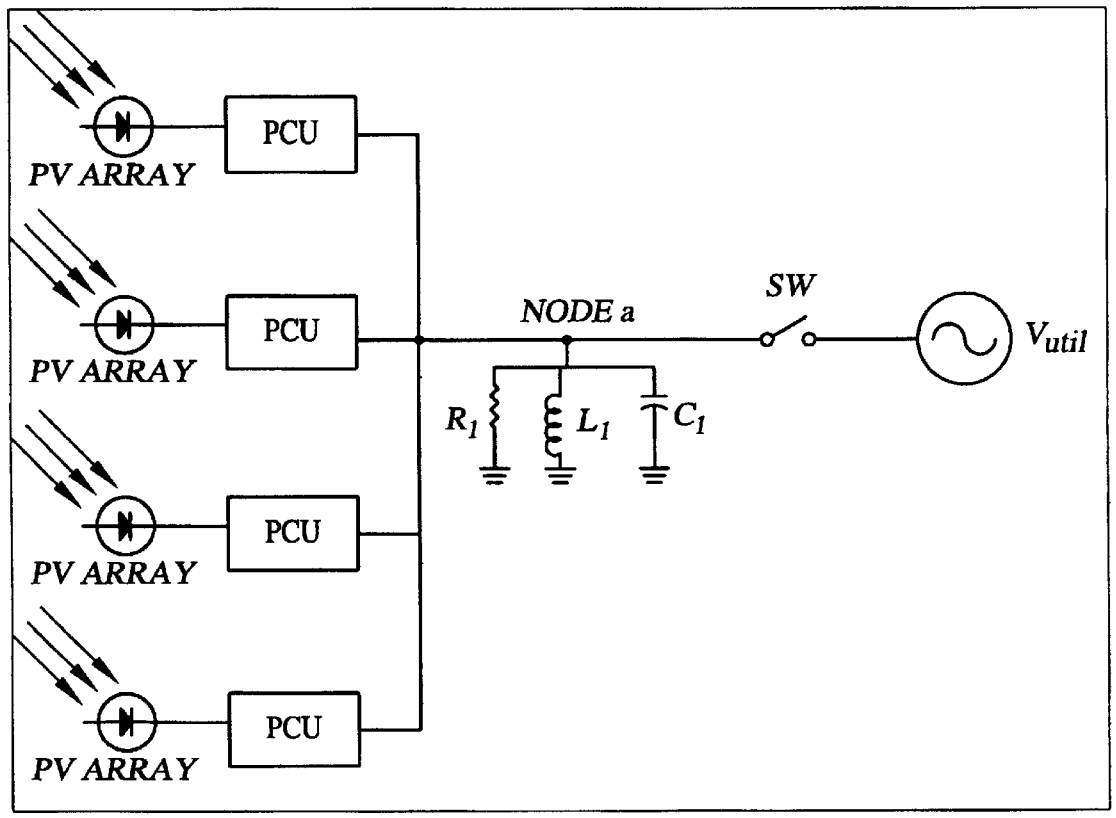
FIG. 27 is a schematic diagram of a representative system used to investigate the so called multiple-inverter case.
Figure 28:
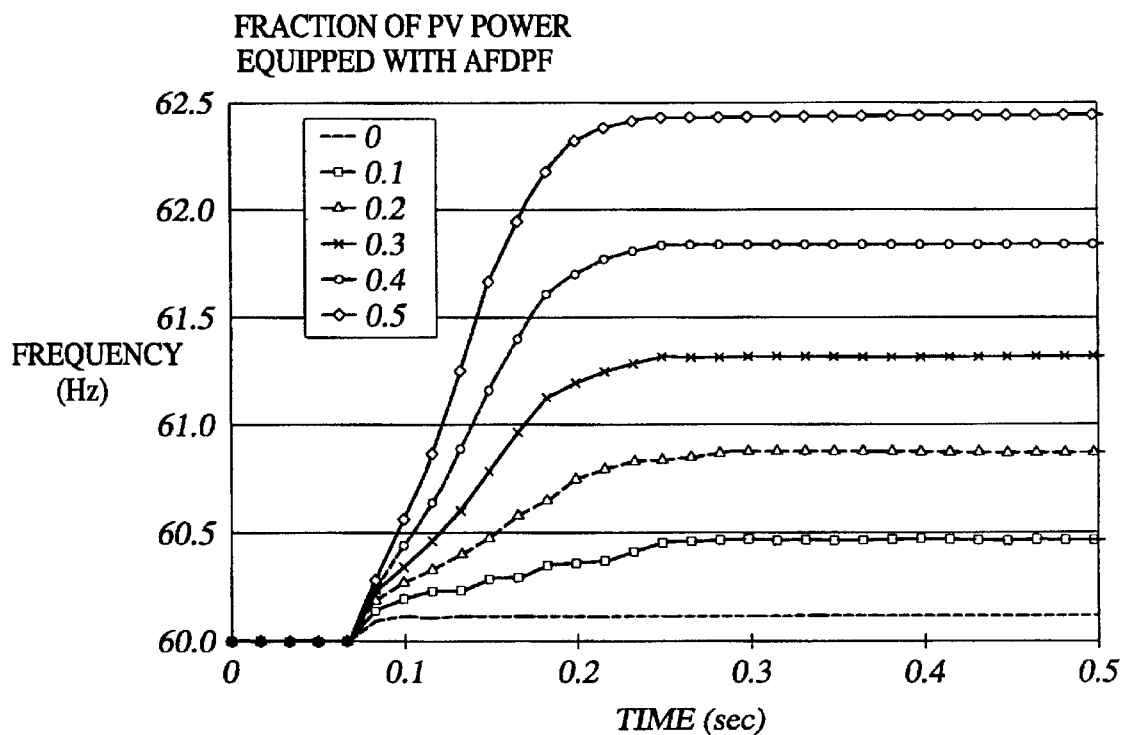
FIG. 28 is a graph depicting frequency of $V_a$ versus time for the representative system depicted in FIG. 27.

AFDPF has the potential to eliminate the problem of reduced effectiveness in the "multiple inverter case" in which there are many PV systems within the island. This is because the positive feedback action enables an AFDPF-equipped PV system to reinforce whatever frequency deviation is produced by the other PV systems, or by any other device in the island. If all PV systems in the island were equipped with AFDPF, they would detect islanding as a group in the same way that they would individually, albeit perhaps in a slightly longer time due to differences in gains and other practical considerations such as impedances between the PCUs. However, it is not required that all PV systems use AFDPF for this synergistic effect to occur. To illustrate this, consider a simplified simulated island containing four PV systems, as shown in FIG. 27. In this system, the top PV system is equipped with linear AFDPF, while the other three have no islanding prevention methods beyond the four standard relays. The total power of the four PV systems is always set to match the load real power requirement (the PV generation to load ratio is approximately 1). Impedance between the PCUs is ignored, which is essentially the same as assuming that there are no transformers between the PCUs and the POCC. The load has R=14.4Ω, L=10 mH, and C=700 µF, corresponding to a $C_{norm}$ of 0.995. This load lies within the NDZ of the OFR/UFR/OVR/UVR, but outside that of AFDPF. The results of system simulations are plotted in FIG. 28. This plot shows the frequency of the system as a function of time. Each curve corresponds to a different fraction of the PV power being equipped with AFDPF. In other words, the single AFDPF-equipped PV system is varied in size (power rating), and the other three systems equally share the remaining real load power demand. The gain of the AFDPF system is 0.1 Hz$^{-1}$. The results of this simulation show that even if only a small amount of the total PV generation within the island is equipped with AFDPF (approximately 20% or more), the frequency within the island can still be driven outside the OFR/UFR trip limits. Thus, this simulation demonstrates that AFDPF can help prevent islanding even if not all of the PCUs within the island are using it.

In addition, AFDPF would work in conjunction with PV systems using other islanding prevention schemes. For example, it would enhance the islanding protection of a PCU using harmonic detection, because the THD of the AFDPF system's output current will increase when islanding begins, thereby increasing the THD of $v_a$. A PCU using phase-jump detection also may work better because AFDPF will increase the rate of change of the frequency in the island, leading to a larger phase jump from one cycle to the next.

Other Choices for the Positive Feedback Function

For all the AFDPF work described up to this point, the linear $F\Delta\omega_k$ was used. However, any $F\Delta\omega_k$ which satisfies the condition that $F\Delta\omega_k$ have the same sign as $\Delta\omega_k$ could be used to implement AFDPF. This includes, for example, nonlinear and piecewise-linear functions. In fact, it may be desirable to use some other function under certain conditions. For example, an F ($\Delta\omega_k$) might be selected in which the gain increases as the frequency deviation increases. Such a function would shorten run-on times in cases where the load was near the NDZ edge. Conversely, if the grid to which a PV system is connected were weak and frequency deviations were common, an $F(\Delta\omega_k)$ might be selected in which the gain decreases as the frequency deviation decreases in order to improve power quality. However, care must be exercised when selecting $F(\Delta\omega_k)$.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention.

What is claimed is:

1. A method for reducing size of a non-detection zone in a grid-connected power system having an electrical power generator with an interface to the grid, the method comprising the steps of:

measuring frequency deviation between an output signal of the grid and an output signal of the grid-connected power system;

applying the measured frequency deviation to the output signal of the grid-connected power system; and when the measured frequency of the output signal of the grid-connected power system satisfies an established cut-off level, discontinuing the output signal of the grid-connected power system.

2. The method of claim 1, wherein the step of applying the measured frequency deviation includes the step of applying the measured frequency deviation to an output signal of the grid-connected power system such that the application thereof accelerates a shift in frequency of the output signal delivered from the grid-connected power system.

3. The method of claim 1, wherein the step of applying the measured frequency deviation includes the step of using the measured frequency deviation as an argument of a function F.

4. The method of claim 3, wherein the function F is a linear function.

5. A power conditioning unit for use in an electrical power system, the electrical power system being adapted to supply AC electrical power to a grid-connected load, the electrical power system being configured to convert energy into a DC electrical output signal, said power conditioning unit comprising:

an inverter configured to receive the DC electrical output signal of the electrical power system, to convert the DC electrical output signal of the electrical power system into an AC output signal, and to deliver said AC output signal to the grid-connected load;

a controller configured to measure the frequency deviation between an output signal of the grid and an output signal of the grid-connected power system, apply the measured frequency deviation to the output signal of the grid-connected power system, and discontinue the output signal of the grid-connected power system when the measured frequency of the output signal of the grid-connected power system satisfies an established cut-off level; and a feedback loop interconnecting said AC output signal and said controller such that said feedback loop provides said controller with information regarding said AC output signal;

said power conditioning unit being further configured to cease delivering said AC output signal therefrom when a characteristic of said AC output signal satisfies an established criterion.

6. The power conditioning unit of claim 5, further comprising an over-frequency relay and under-frequency relay, said over-frequency relay being adapted to prevent delivery of said AC output signal from said power conditioning unit in response to an established over-frequency threshold of said AC output signal, said under-frequency relay being adapted to prevent delivery of said AC output signal from said power conditioning unit in response to an established under-frequency threshold of said AC output signal; and wherein said controller is configured to accelerate a shift in frequency of said output signal via a modification signal from said controller such that one of said relays prevents delivery of said AC output signal from said power conditioning unit.

7. The grid-connected power system of claim 5, wherein said controller comprises means for measuring a frequency deviation of said AC output signal and means for generating a modification signal corresponding to said frequency deviation.

8. A computer readable medium having a computer program for reducing size of a non-detection zone in a grid network, the grid network having a grid-connected load and a grid-connected power system configured for supplying power thereto, the grid-connected power system having a DC electric generator and a power conditioning unit, said computer readable medium comprising:

a first code segment configured to measure frequency deviation between an output signal of the grid and an output signal of the grid-connected power system;

a second code segment configured to apply the measured frequency deviation to the output signal of the grid-connected power system; and a third code segment configured to discontinue output signal of the grid-connected power system at the power conditioning unit when the measured frequency of the output signal of the grid-connected power system satisfies an established cut-off level.

9. The computer readable medium of claim 8, wherein the second code segment comprises a code segment configured to utilize the measured frequency deviation as an argument of a function F.

10. The computer readable medium of claim 9, wherein the function F is a linear function.

* * * * *

UNITED STATES PATENT AND TRADEMARK OFFICE
CERTIFICATE OF CORRECTION

PATENT NO. : 6,429,546 B1
DATED : August 6, 2002
INVENTOR(S) : Ropp et al.

It is certified that error appears in the above-identified patent and that said Letters Patent is hereby corrected as shown below:

Column 5,
Line 36, delete "$Q_{load}=V_a$"

Column 8,
Line 39, delete "≧" and replace it with -- ≥ --

Column 9,
Line 17, delete "$\arg\{R^{-1} + j\omega C - j(\omega L)^{-1} = -\arg\}G(j\omega)\}$" and replace it with
-- $\arg\{R^{-1} + j\omega C - j(\omega L)^{-1}\} = -\arg\{G(j\omega)\}$ --

Column 11,
Line 39, after "thereof" insert -- . --

Column 13,
Line 21, delete "$cf_k=cf_o+$"
Line 28, delete "$F(\Delta\omega_{k-n})$" and
Line 28, delete "[10]"

Column 15,
Lines 6-7, 8-9, 9-10 and 11-12, delete "0.8 ≦ $C_{norm}$ ≦ 1.2" and replace it with
-- 0.8 ≤ $C_{norm}$ ≤ 1.2 --

Column 18,
Line 15, delete "$FF_n \bullet [(\omega_{k-n}-\omega_0)]$"
Line 15, delete "[15]"

Column 21,
Lines 17-18, replace "load real power" with -- load's real power --

Signed and Sealed this

Eleventh Day of February, 2003

JAMES E. ROGAN
*Director of the United States Patent and Trademark Office*